(12) United States Patent
Mogi

(10) Patent No.: US 12,055,703 B2
(45) Date of Patent: Aug. 6, 2024

(54) OBSERVATION OPTICAL SYSTEM AND IMAGE DISPLAY APPARATUS HAVING THE SAME

(71) Applicant: CANON KABUSHIKI KAISHA, Tokyo (JP)

(72) Inventor: Shuichi Mogi, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 471 days.

(21) Appl. No.: 17/388,057

(22) Filed: Jul. 29, 2021

(65) Prior Publication Data

US 2021/0356731 A1  Nov. 18, 2021

Related U.S. Application Data

(63) Continuation of application No. PCT/JP2020/003736, filed on Jan. 31, 2020.

(30) Foreign Application Priority Data

Feb. 14, 2019  (JP) .................................. 2019-024086

(51) Int. Cl.
*G02B 25/00* (2006.01)
*G02B 3/08* (2006.01)
*G02B 9/10* (2006.01)
*G02B 9/16* (2006.01)
(Continued)

(52) U.S. Cl.
CPC .............. *G02B 25/001* (2013.01); *G02B 3/08* (2013.01); *G02B 9/10* (2013.01); *G02B 9/16* (2013.01); *G02B 9/34* (2013.01); *G02B 9/60* (2013.01)

(58) Field of Classification Search
CPC .......... G02B 25/001; G02B 3/08; G02B 9/10; G02B 9/16; G02B 9/34; G02B 9/60; G02B 27/0012; G02B 27/0172; G02B 27/4205; G02B 23/14; G02B 13/18; G03B 13/02; G03B 13/06
See application file for complete search history.

(56) References Cited

U.S. PATENT DOCUMENTS

| 9,110,275 | B2 | 8/2015 | Mogi |
| 9,900,514 | B2 | 2/2018 | Mogi |
| 2018/0231699 | A1 | 8/2018 | Ebe |

(Continued)

FOREIGN PATENT DOCUMENTS

| CN | 102193197 A | 9/2011 |
| CN | 105556368 A | 5/2016 |

(Continued)

OTHER PUBLICATIONS

Office Action issued by the Chinese Patent Office on Oct. 18, 2022 in CN Patent Application No. 202080013423.0, with English Translation.

(Continued)

*Primary Examiner* — James C. Jones
(74) *Attorney, Agent, or Firm* — Carter, DeLuca & Farrell LLP

(57) ABSTRACT

An observation optical system is configured to observe an image displayed on an image display plane and includes a negative lens and a positive lens. At least one of the negative lens and the positive lens has a lens surface having a Fresnel shape. A predetermined condition is satisfied.

12 Claims, 15 Drawing Sheets

(51) Int. Cl.
*G02B 9/34* (2006.01)
*G02B 9/60* (2006.01)

(56) References Cited

U.S. PATENT DOCUMENTS

| | | | |
|---|---|---|---|
| 2018/0275392 A1* | 9/2018 | Song | G02B 27/0025 |
| 2019/0302430 A1 | 10/2019 | Ebe | |
| 2021/0116687 A1 | 4/2021 | Mogi | |
| 2021/0223522 A1 | 7/2021 | Mogi | |

FOREIGN PATENT DOCUMENTS

| | | |
|---|---|---|
| CN | 106164731 A | 11/2016 |
| CN | 106338820 A | 1/2017 |
| CN | 107045196 A | 8/2017 |
| CN | 107144968 A | 9/2017 |
| CN | 109828368 A | 5/2019 |
| JP | 2003-329935 A | 11/2003 |
| JP | 2017-211475 A | 11/2017 |
| JP | 2018-101131 A | 6/2018 |
| JP | 2018-132579 A | 8/2018 |
| JP | 2020-013106 A | 1/2020 |
| WO | 2018/117025 A1 | 6/2018 |
| WO | 2018145367 A1 | 8/2018 |

OTHER PUBLICATIONS

International Search Report issued by the Japan Patent Office on Mar. 31, 2020 in corresponding International Application No. PCT/JP2020/003736, with English translation.

International Preliminary Report on Patentability issued by the International Bureau of WIPO on behalf of the Japan Patent Office acting as International Searching Authority on Aug. 10, 2021 in corresponding International Application No. PCT/JP2020/003736, with English Translation.

* cited by examiner

OBSERVATION OPTICAL SYSTEM AND IMAGE DISPLAY APPARATUS HAVING THE SAME

CROSS-REFERENCE TO RELATED APPLICATIONS

This application is a Continuation of International Patent Application No. PCT/JP2020/003736, filed on Jan. 31, 2020, which claims the benefit of Japanese Patent Application No. 2019-024086, filed on Feb. 14, 2019, both of which are hereby incorporated by reference herein in their entirety.

BACKGROUND OF THE INVENTION

Field of the Invention

The present invention relates to an observation optical system suitable for an image display apparatus, such as an electronic viewfinder.

Description of the Related Art

An observation optical system has conventionally been known which includes a plurality of lenses so as to observe an image display plane such as a liquid crystal panel. Such an observation optical system is demanded to secure a wide field of view (high magnification) and an eye relief in order to enhance the visibility, and to satisfactorily correct various aberrations. In order to reduce the size (thinness) of the observation optical system, it is desired to use a small image display plane.

Japanese Patent Laid-Open No. ("JP") 2018-101131 discloses a compact observation optical system having a wide field of view. JP 2003-329935 discloses an electronic viewfinder that applies a diffraction optical element to an eyepiece and properly sets a designed wavelength of a high diffraction efficiency.

However, in the observation optical systems disclosed in JPs 2018-101131 and 2003-329935, when the power of the positive lens is increased in order to enhance the optical performance, the central thickness of the positive lens increases. Therefore, the size reduction (thickness reduction and weight reduction) of the observation optical system is difficult.

SUMMARY OF THE INVENTION

The present invention provides a compact observation optical system having high optical performance, and an image display apparatus.

An observation optical system according to one aspect of the present invention is an observation optical system configured to observe an image displayed on an image display plane includes a negative lens and a positive lens, at least one of the negative lens and the positive lens having a lens surface having a Fresnel shape, and a predetermined conditional expression is satisfied where $\Phi r$ is a power of the lens surface having the Fresnel shape (which is a maximum value of the power when there are a plurality of lens surfaces each having the Fresnel shape), $\Phi f$ is a power of the observation optical system as a whole, hsag is a maximum length (mm) of a wall surface on the lens surface having the Fresnel shape, and $\lambda$ is a wavelength (mm) of d-line.

An image display apparatus according to another aspect of the present invention includes the above observation optical system.

Further features of the present invention will become apparent from the following description of exemplary embodiments with reference to the attached drawings.

DESCRIPTION OF THE EMBODIMENTS

Referring now to the accompanying drawings, a detailed description will be given of examples according to the present invention.

Figure 1:
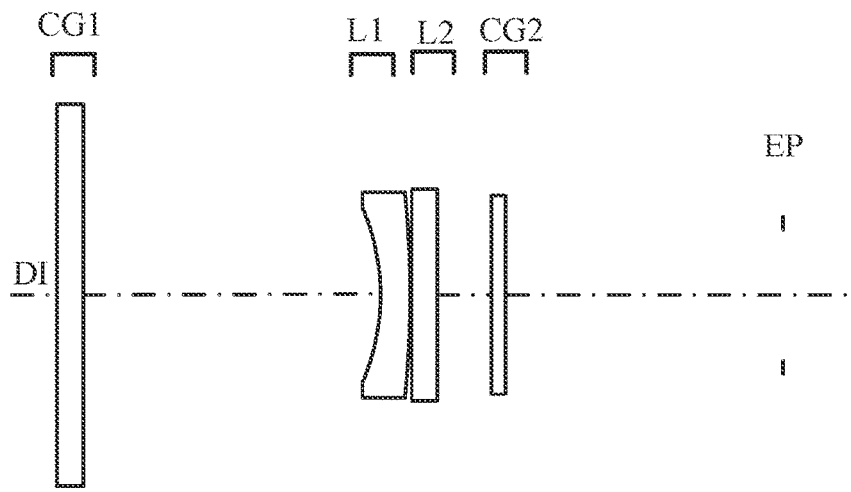
FIG. 1 is a sectional view of an observation optical system according to Example 1.
Figure 2:
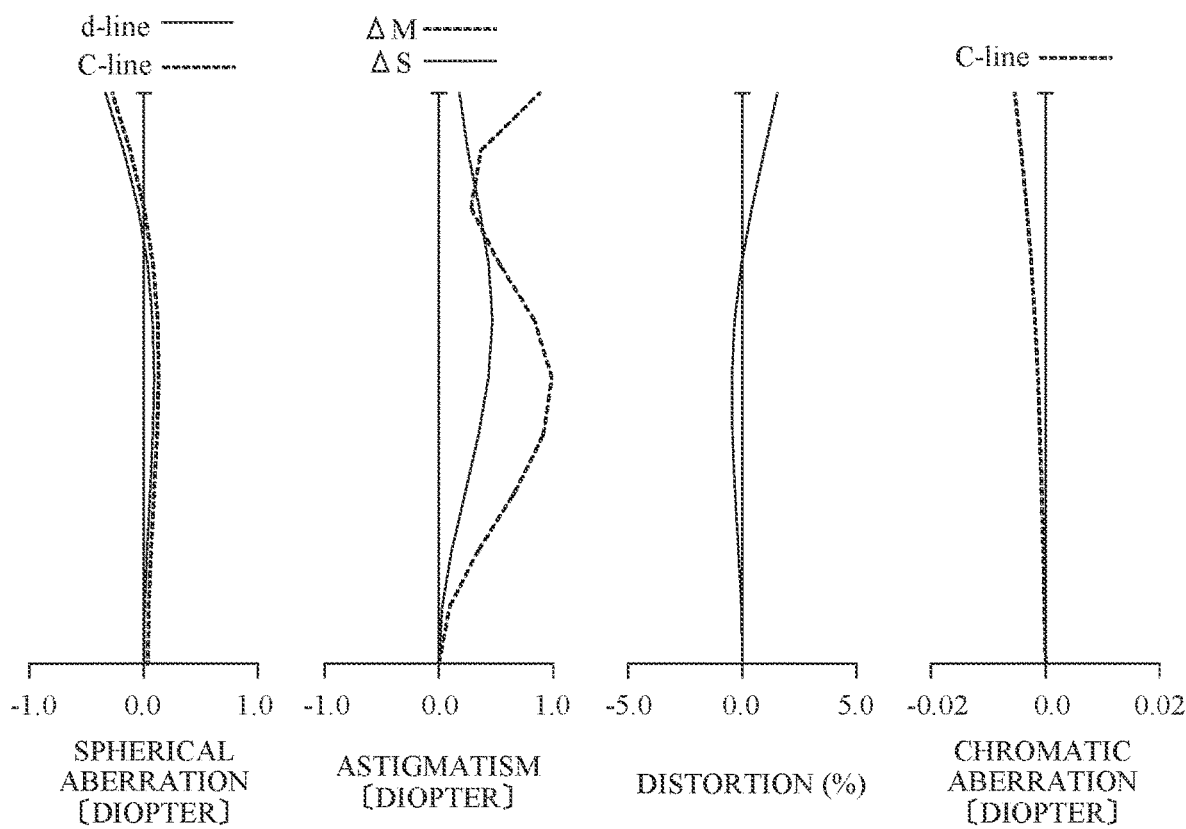
FIG. 2 is an aberration diagram of the observation optical system according to Example 1.
Figure 3:
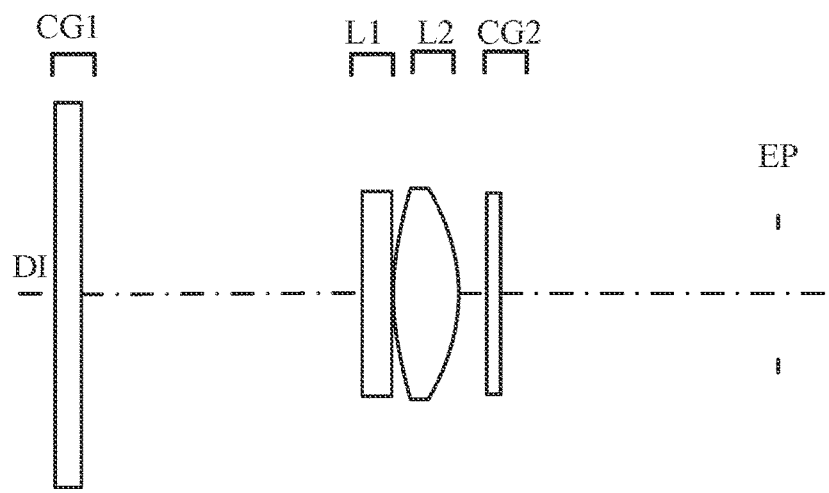
FIG. 3 is a sectional view of an observation optical system according to Example 2.
Figure 4:
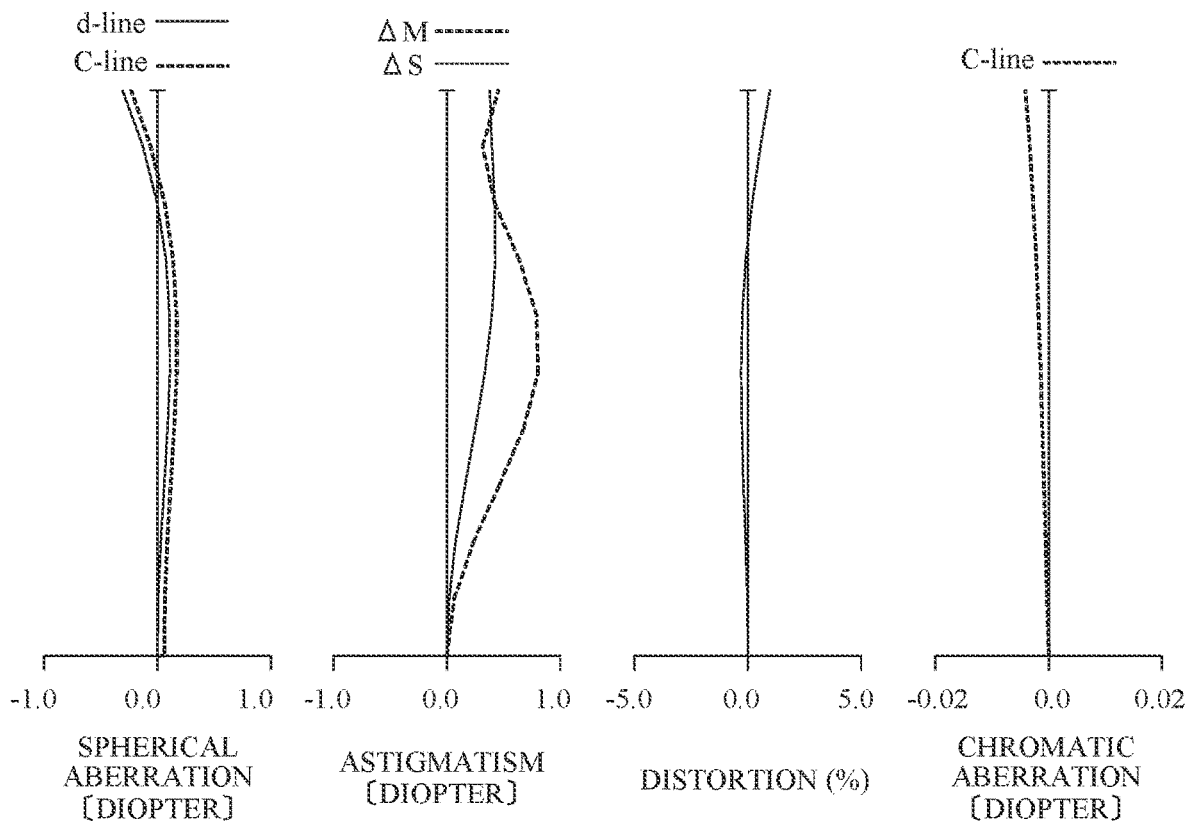
FIG. 4 is an aberration diagram of the observation optical system according to Example 2.
Figure 5:
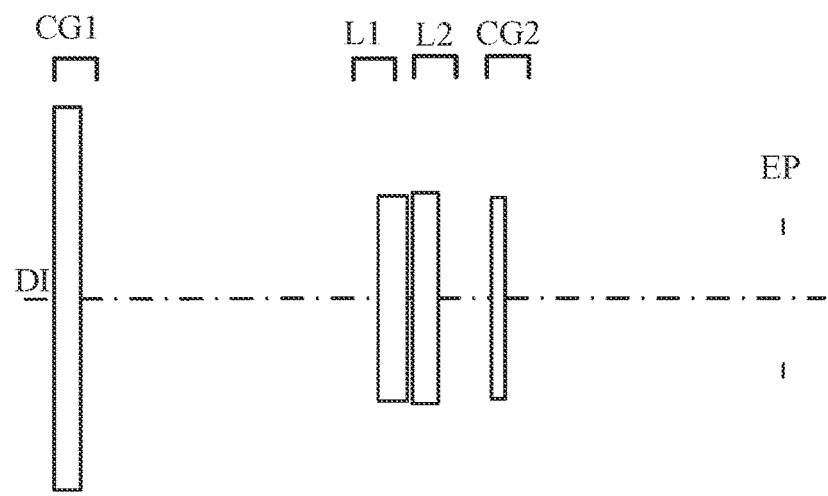
FIG. 5 is a sectional view of an observation optical system according to Example 3.
Figure 6:
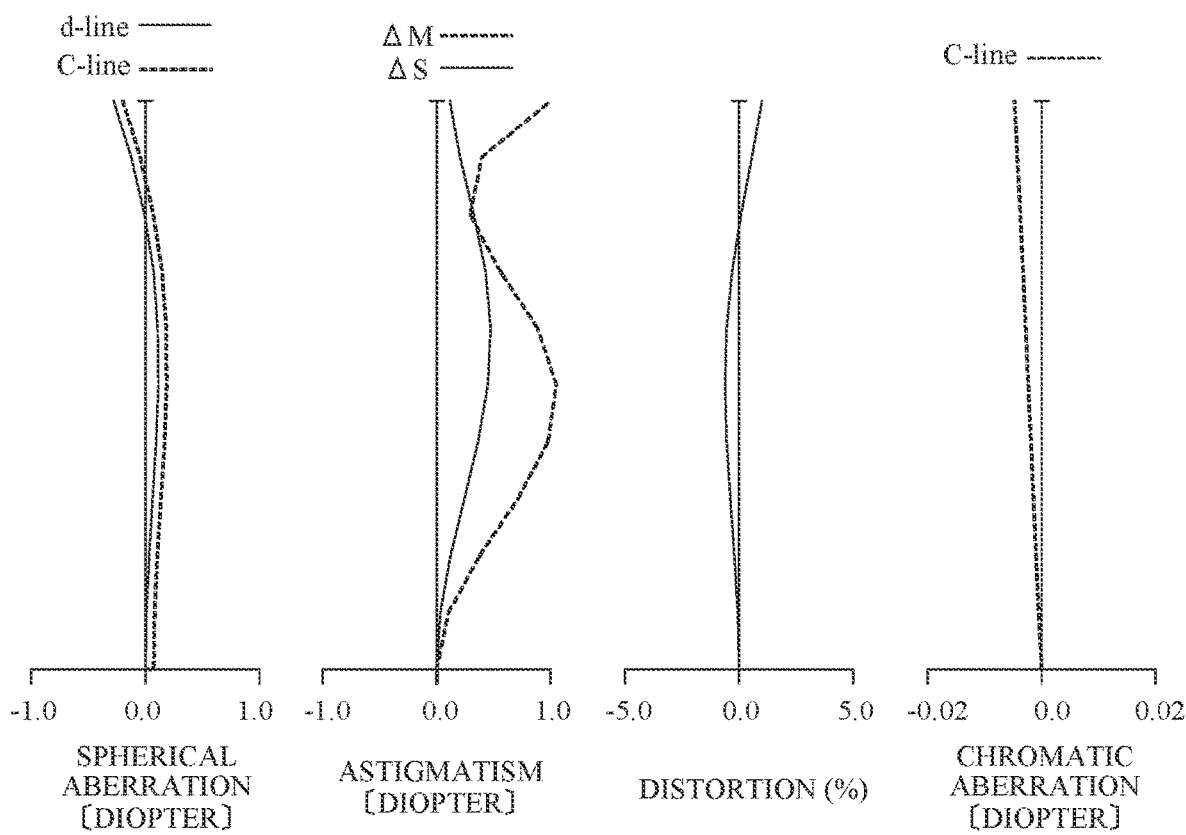
FIG. 6 is an aberration diagram of the observation optical system according to Example 3.
Figure 7:
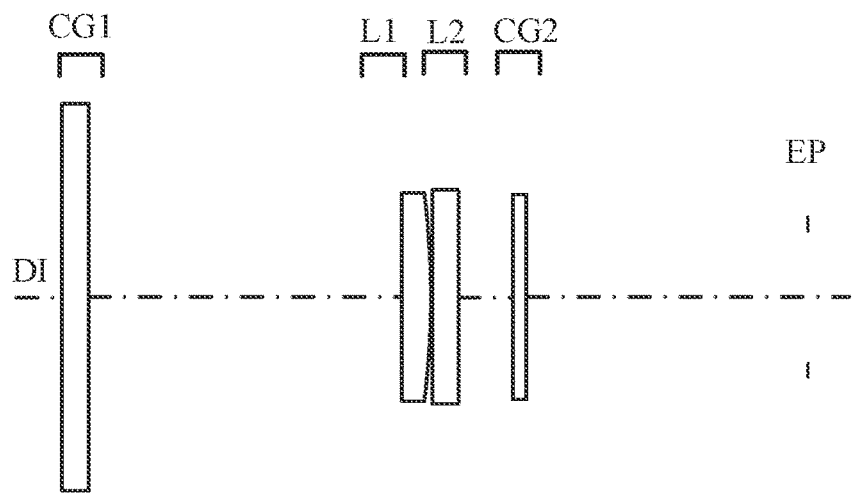
FIG. 7 is a sectional view of an observation optical system according to Example 4.
Figure 8:
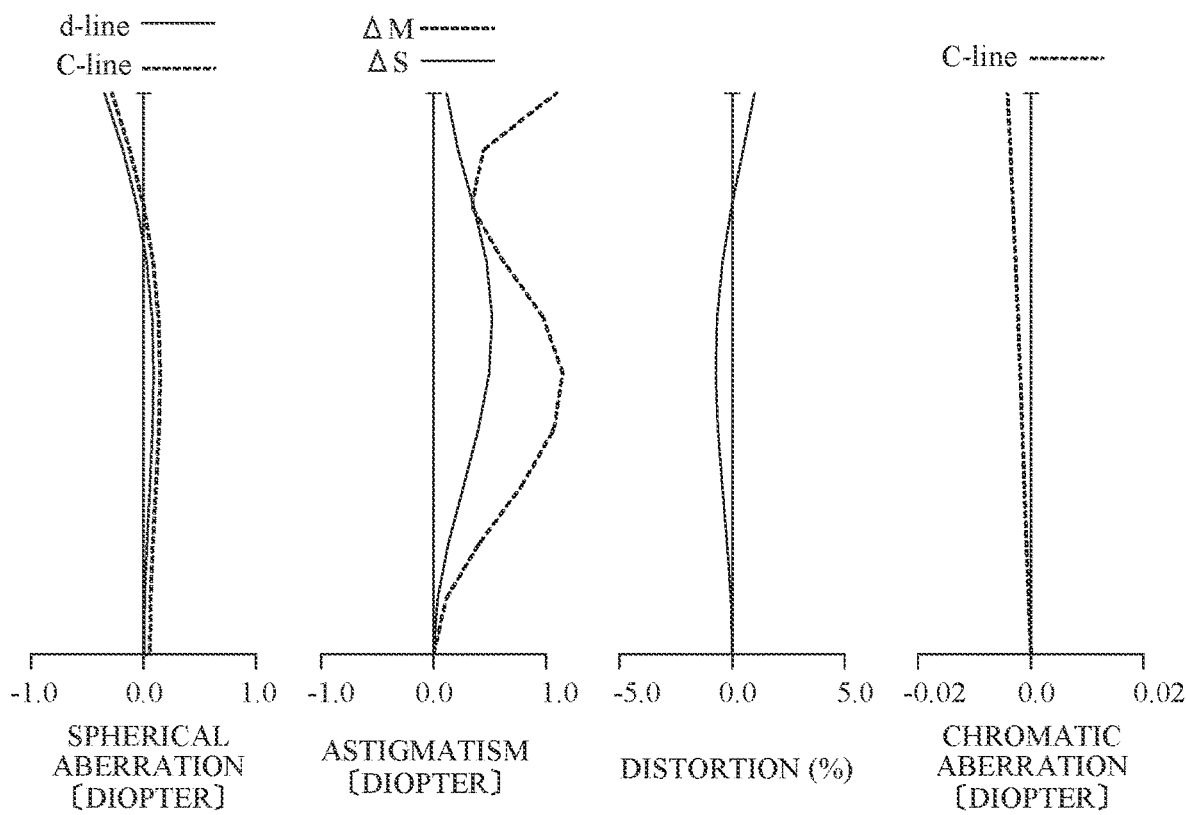
FIG. 8 is an aberration diagram of the observation optical system according to Example 4.
Figure 9:
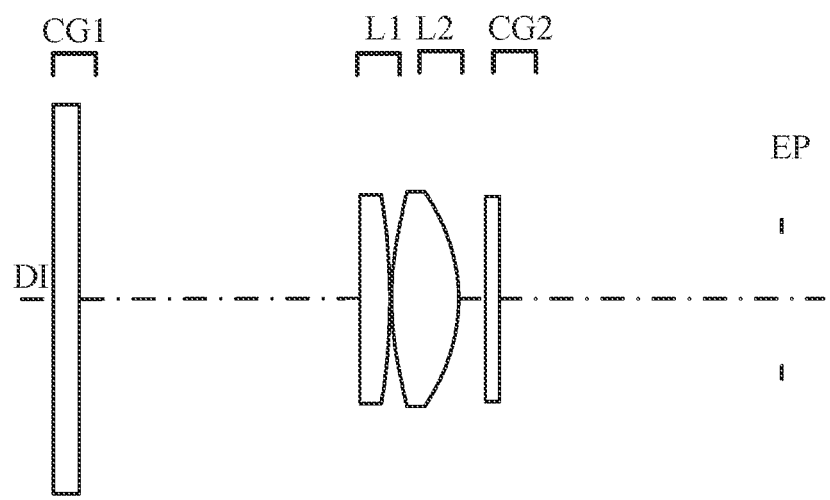
FIG. 9 is a sectional view of an observation optical system according to Example 5.
Figure 10:
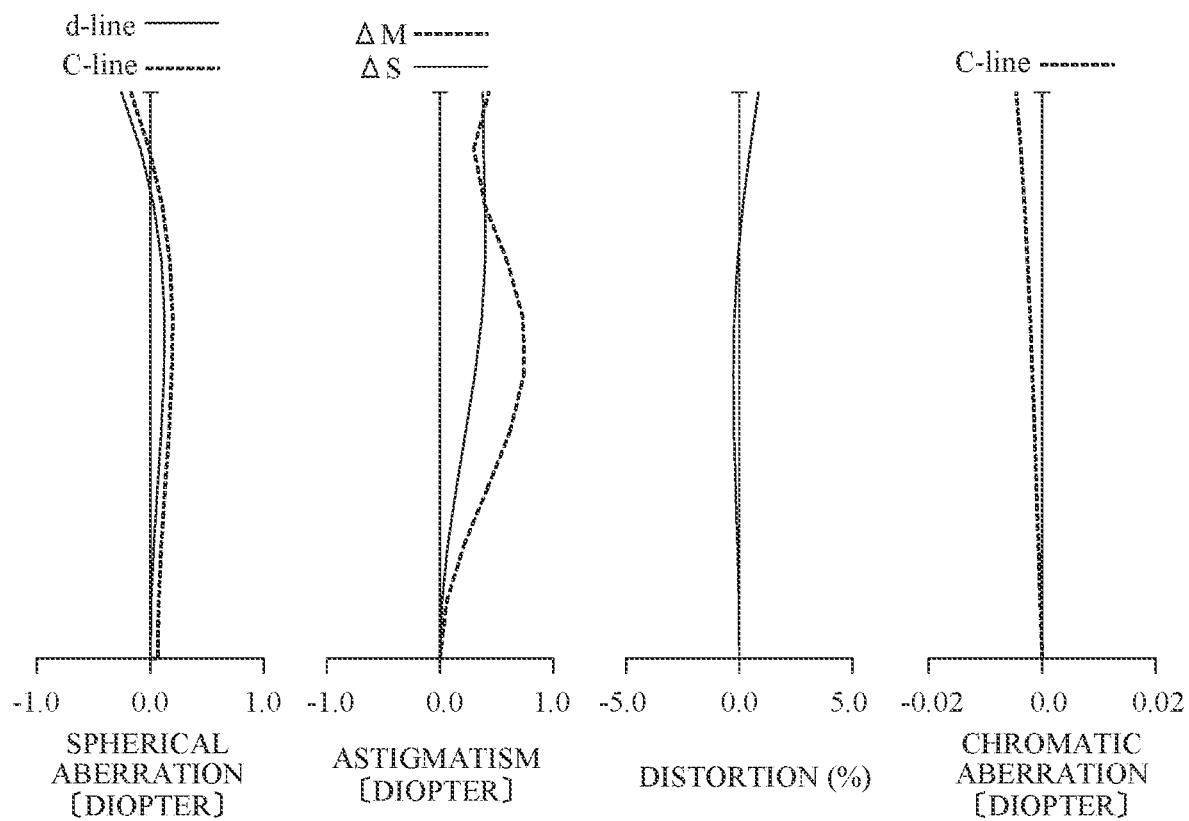
FIG. 10 is an aberration diagram of the observation optical system according to Example 5.
Figure 11:
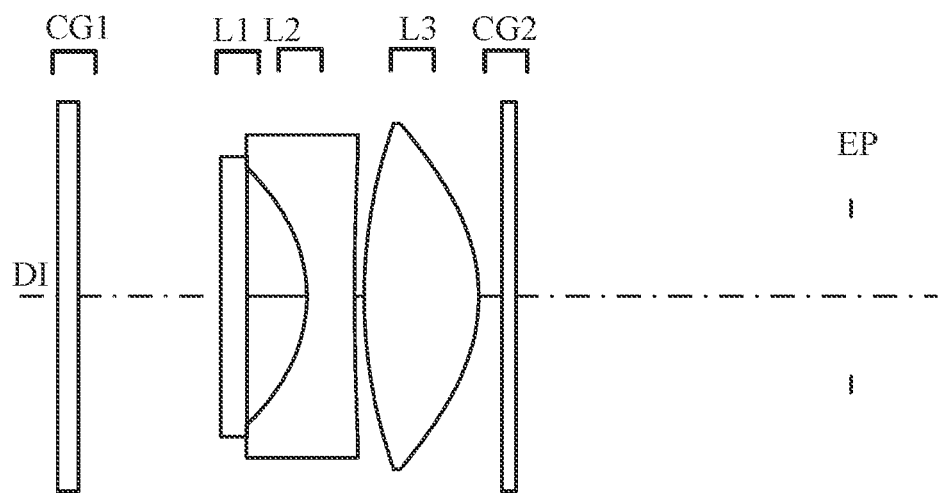
FIG. 11 is a sectional view of an observation optical system according to Example 6.
Figure 12:
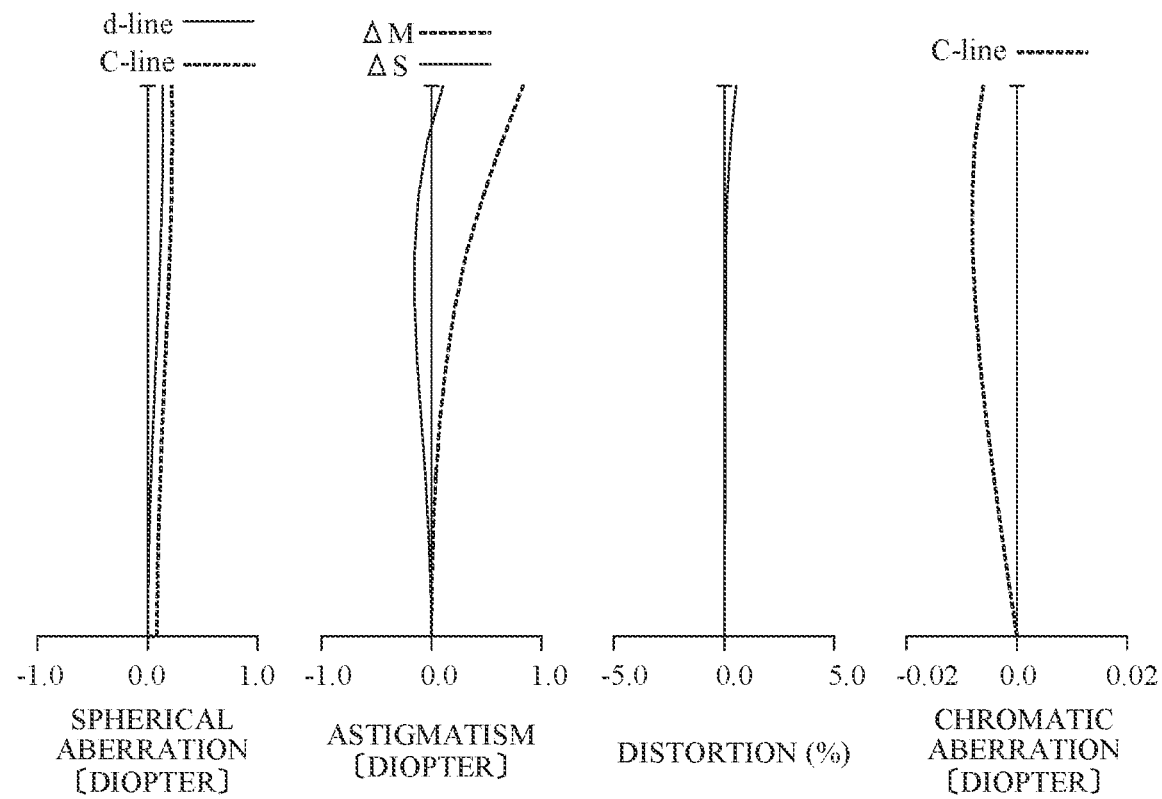
FIG. 12 is an aberration diagram of the observation optical system according to Example 6.
Figure 13:
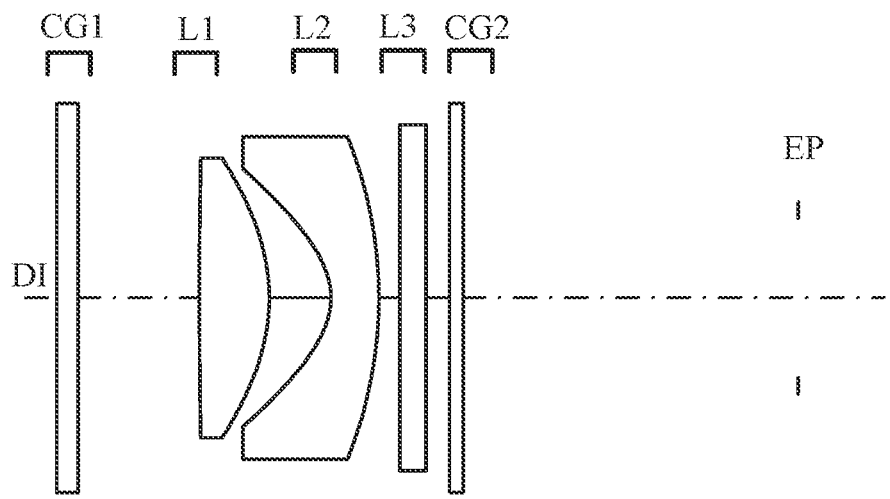
FIG. 13 is a sectional view of an observation optical system according to Example 7.
Figure 14:
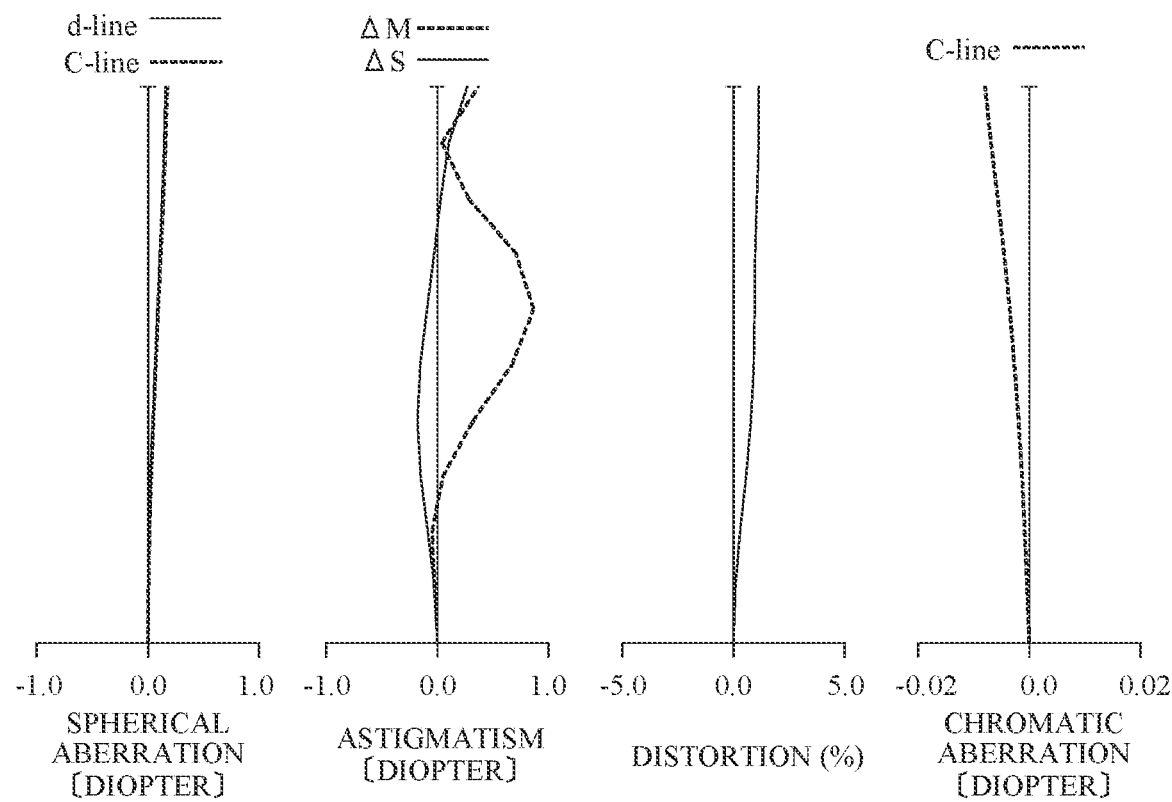
FIG. 14 is an aberration diagram of the observation optical system according to Example 7.
Figure 15:
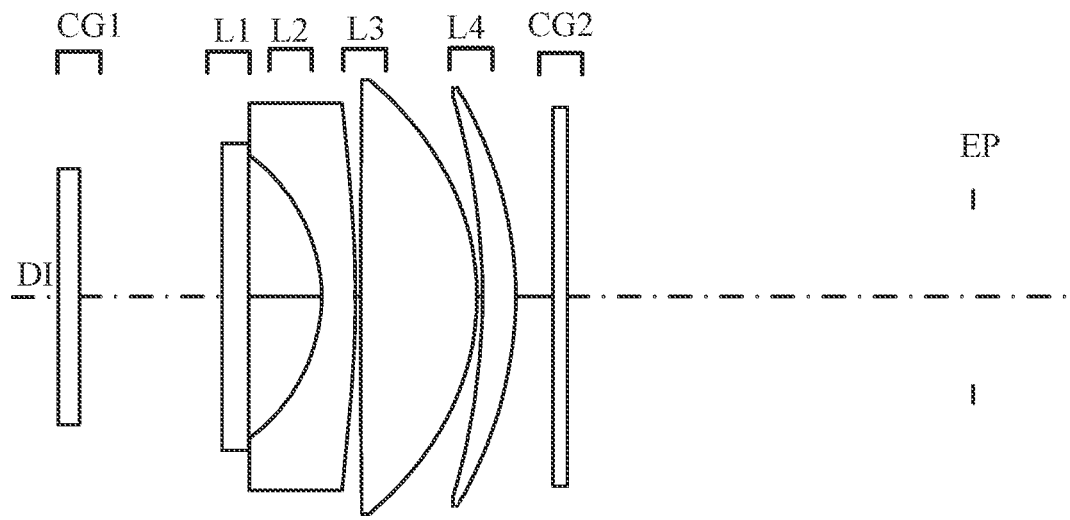
FIG. 15 is a sectional view of an observation optical system according to Example 8.
Figure 16:
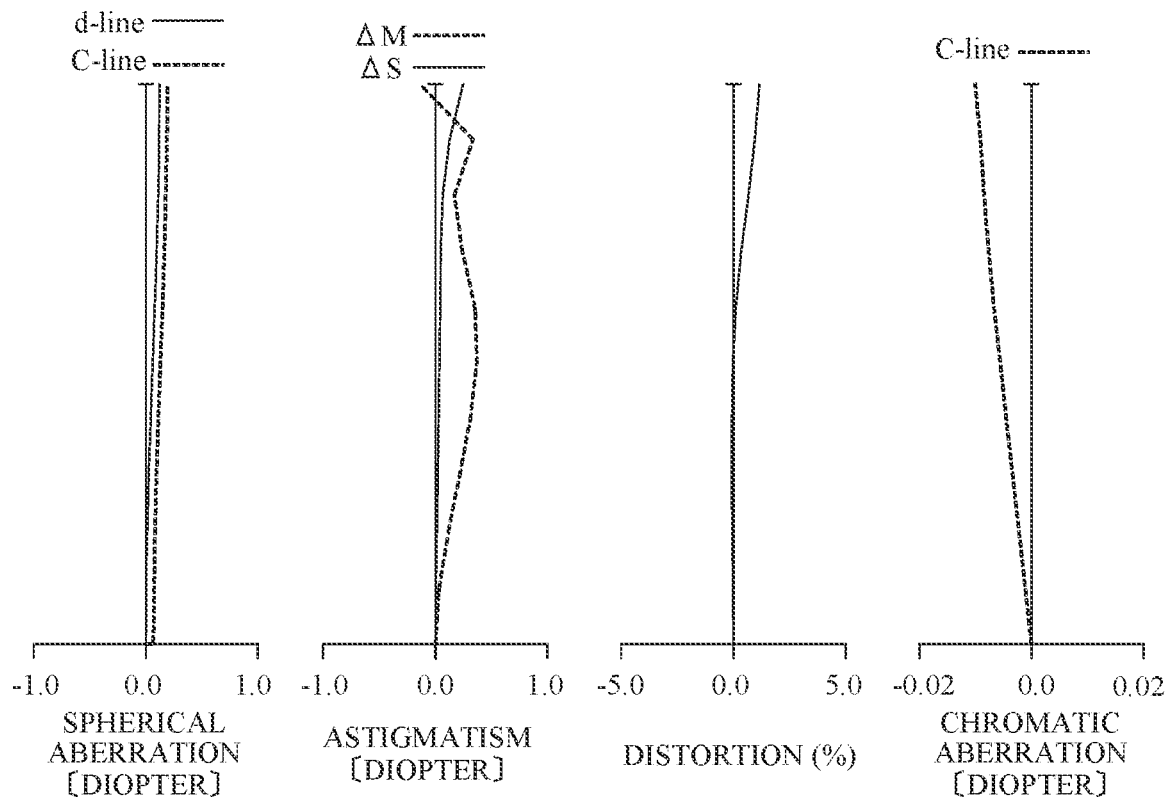
FIG. 16 is an aberration diagram of the observation optical system according to Example 8.
Figure 17:
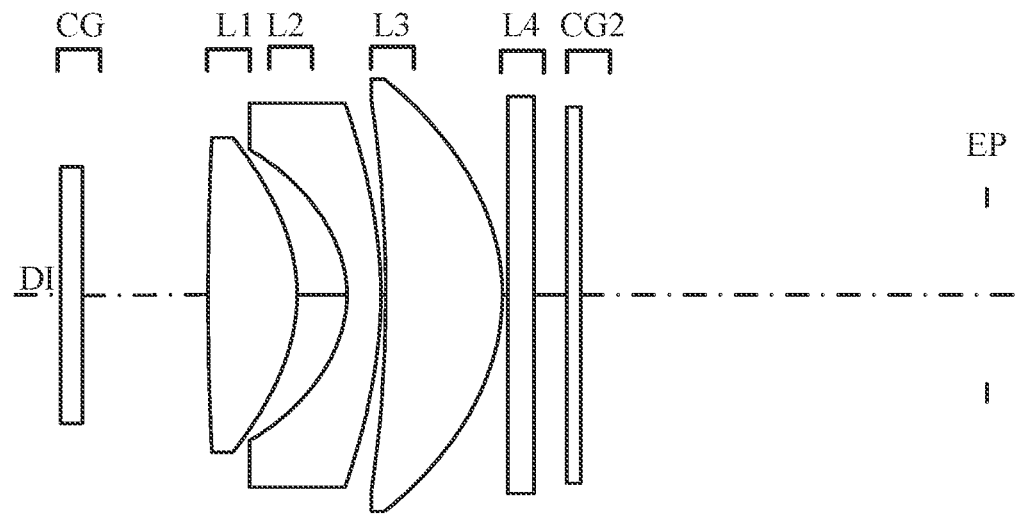
FIG. 17 is a sectional view of an observation optical system according to Example 9.
Figure 18:
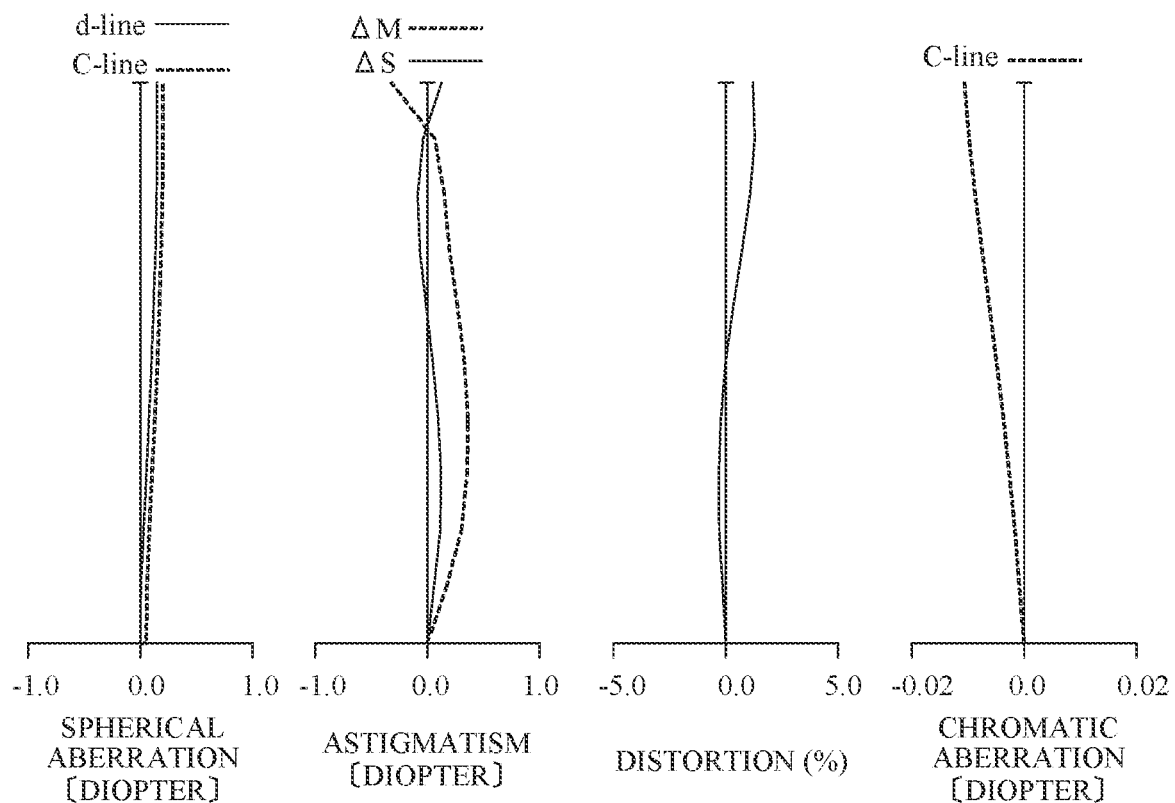
FIG. 18 is an aberration diagram of the observation optical system according to Example 9.
Figure 19:
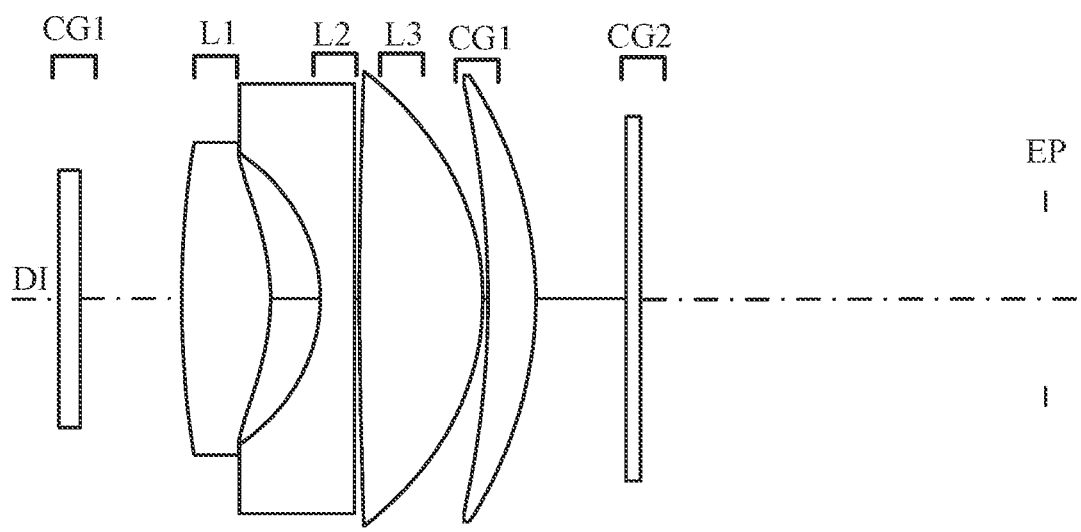
FIG. 19 is a sectional view of an observation optical system according to Example 10.
Figure 20:
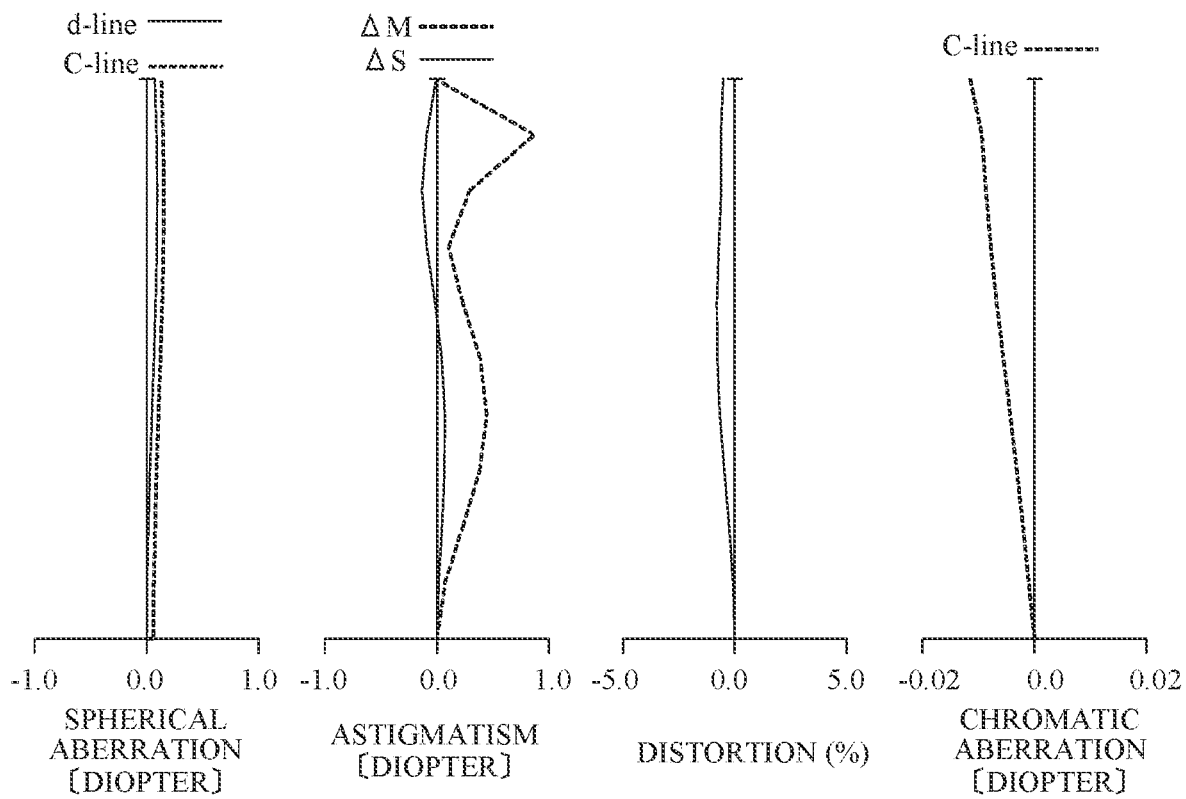
FIG. 20 is an aberration diagram of the observation optical system according to Example 10.
Figure 21:
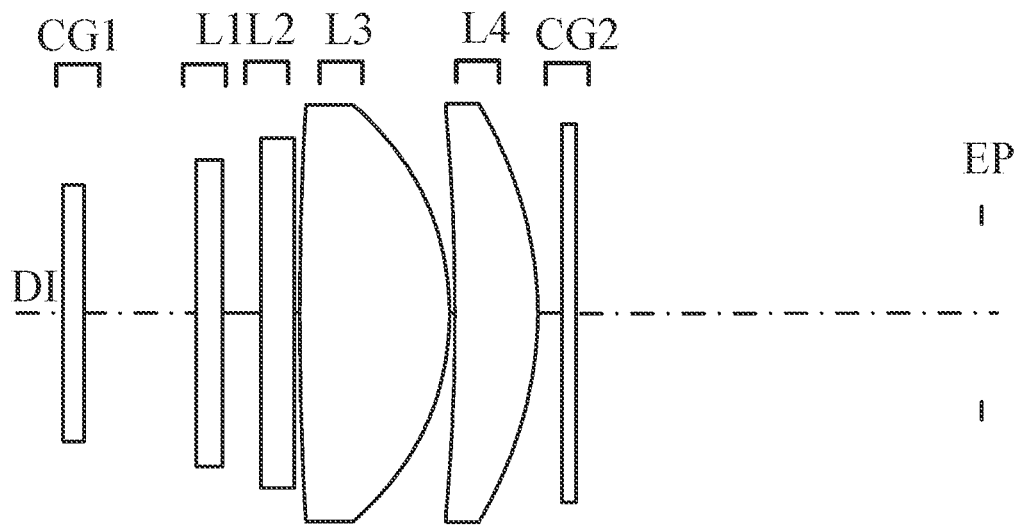
FIG. 21 is a sectional view of an observation optical system according to Example 11.
Figure 22:
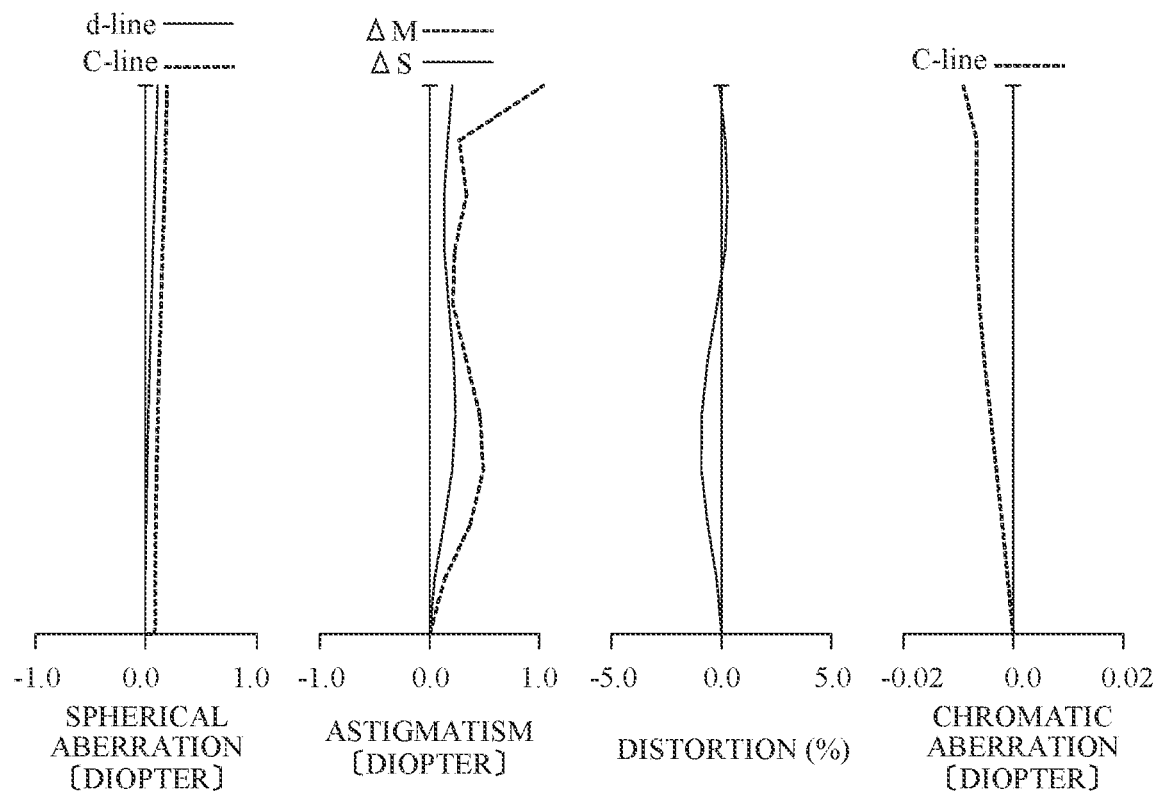
FIG. 22 is an aberration diagram of the observation optical system according to Example 11.
Figure 23:
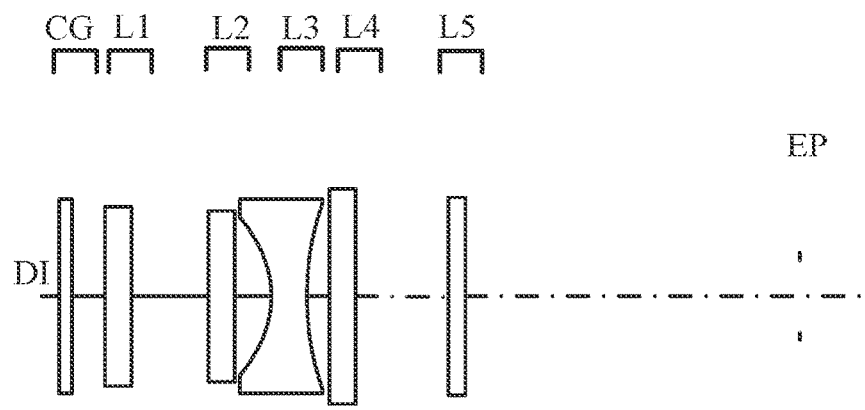
FIG. 23 is a sectional view of an observation optical system according to Example 12.
Figure 24:
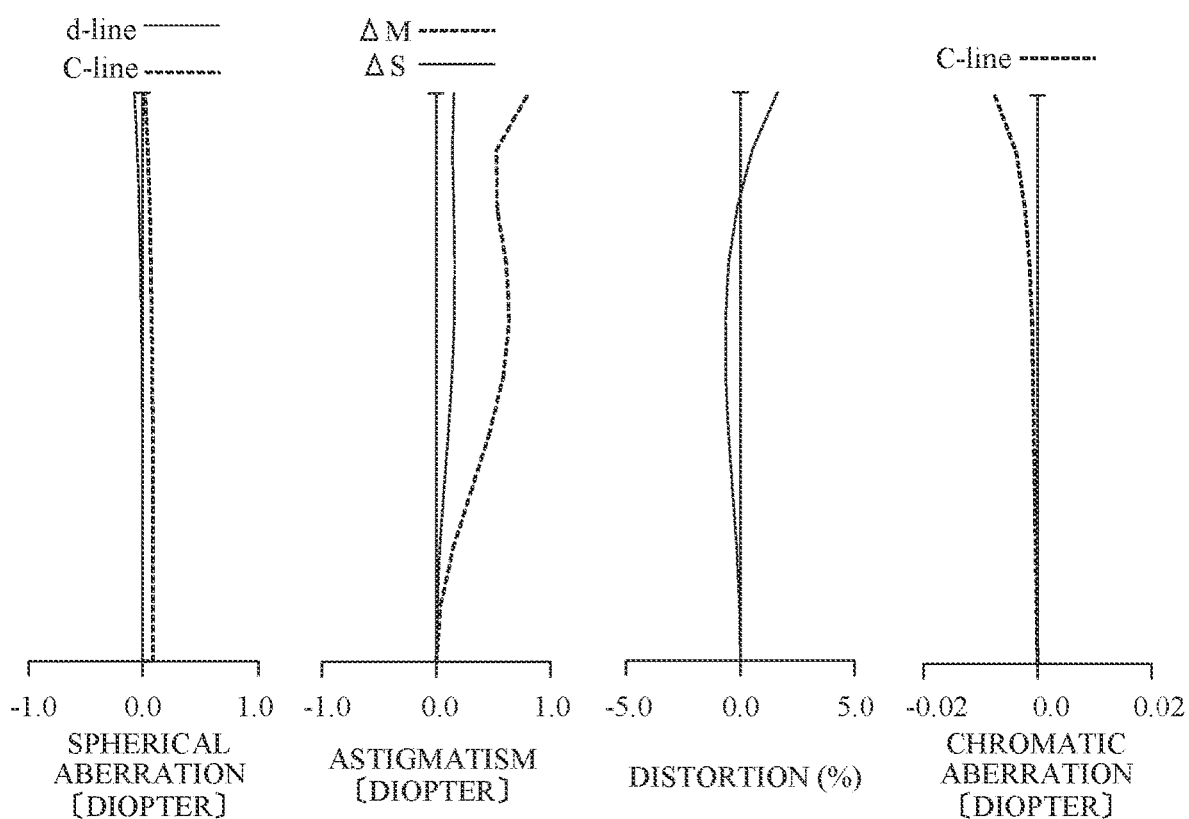
FIG. 24 is an aberration diagram of the observation optical system according to Example 12.
Figure 25:
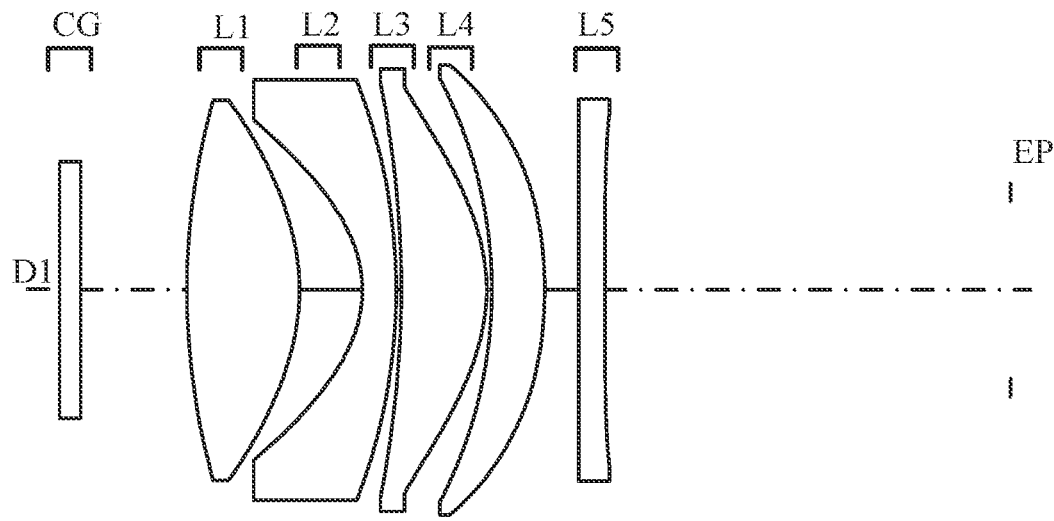
FIG. 25 is a sectional view of an observation optical system according to Example 13.
Figure 26:
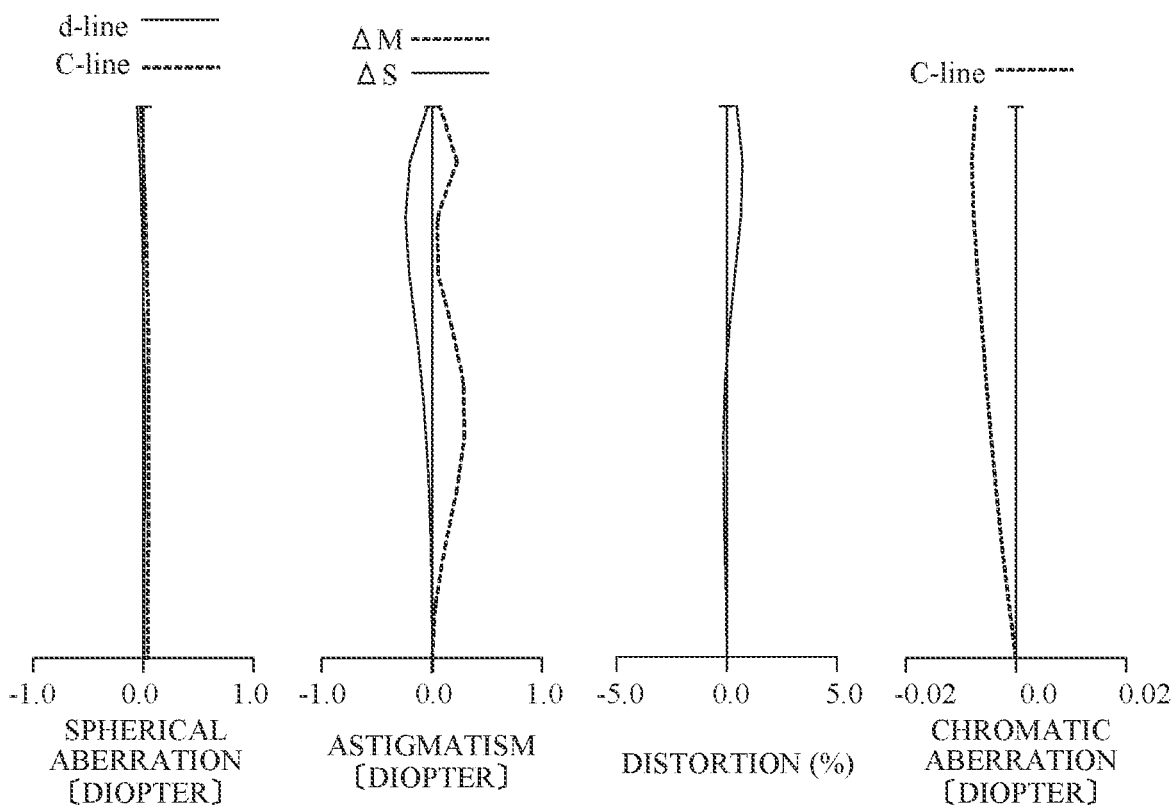
FIG. 26 is an aberration diagram of the observation optical system according to Example 13.
Figure 27:
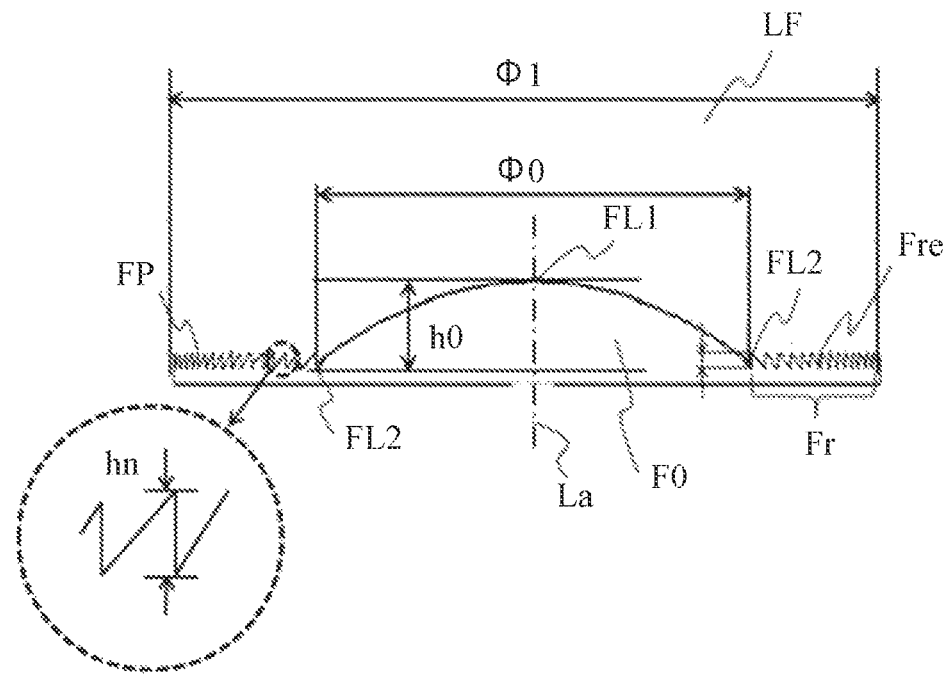
FIG. 27 is an explanatory diagram of a Fresnel lens in each example.
Figure 28:
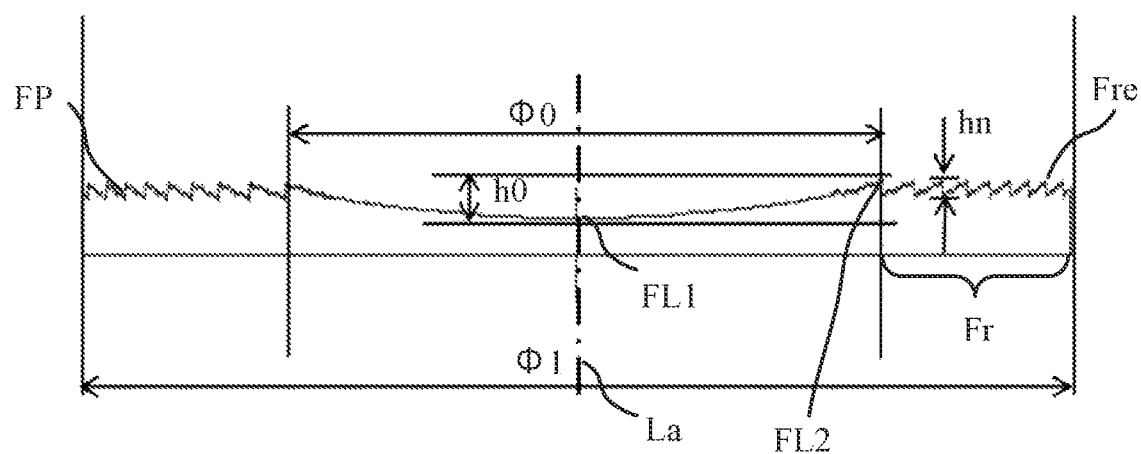
FIG. 28 is an explanatory diagram of a Fresnel lens in each example.

FIG. 1 is a sectional view showing a lens configuration of an observation optical system according to Example 1. FIG. 2 is an aberration diagram showing each aberration (spherical aberration, astigmatism, distortion, chromatic aberration) of the observation optical system according to Example 1. Similarly, FIGS. 3 and 4 are a sectional view and an aberration diagram of an observation optical system according to Example 2, respectively. FIGS. 5 and 6 are a sectional view and an aberration diagram of an observation optical system according to Example 3, respectively. FIGS. 7 and 8 are a sectional view and an aberration diagram of an observation optical system according to Example 4, respectively. FIGS. 9 and 10 are a sectional view and an aberration diagram of an observation optical system according to Example 5, respectively. FIGS. 11 and 12 are a sectional view and an aberration diagram of an observation optical system according to Example 6, respectively. FIGS. 13 and 14 are a sectional view and an aberration diagram of the observation optical system according to Example 7, respectively. FIGS. 15 and 16 are a sectional view and an aberration diagram of an observation optical system according to Example 8, respectively. FIGS. 17 and 18 are a sectional view and an aberration diagram of an observation optical system according to Example 9, respectively. FIGS. 19 and 20 are a sectional view and an aberration diagram of an observation optical system according to Example 10, respectively. FIGS. 21 and 22 are a sectional view and an aberration diagram of an observation optical system according to Example 11, respectively. FIGS. 23 and 24 are a sectional view and an aberration diagram of an observation optical system according to Example 12, respectively. FIGS. 25 and 26 are a sectional view and an aberration diagram of an observation optical system according to Example 13, respectively. FIGS. 27 and 28 are explanatory views of a Fresnel lens LF in each example. FIGS. 27 and 28 show explanatory diagrams of the definition of a length in the optical axis direction from a surface vertex to an end of a central annulus of the Fresnel lens LF, its length of a wall surface (step), a diameter from the surface vertex to the end of the central annulus of the Fresnel lens LF, and an effective diameter of the Fresnel lens LF.

In order to observe a small display panel (image display element) with a diagonal length of about 20 mm or less on the image display plane in a wide field of view (at an angle of view of about 30 degrees or higher), the entire observation optical system needs a strong positive power. Therefore, each lens unit in the observation optical system needs a strong positive refractive power and a strong negative refractive power. However, when the power of each lens is increased, the thickness of the central or peripheral part of the lens increases, so that there is room for improvement from the viewpoint of miniaturization (thinning). Accordingly, as illustrated in FIGS. 1 to 26, the observation optical system according to this embodiment has a negative lens and a positive lens, at least one of the negative lens and the positive lens has a lens surface having a Fresnel shape (Fresnel surface), and the observation optical system satisfies the predetermined conditions.

In FIGS. 27 and 28, Fre is a Fresnel surface (Fresnel-shaped lens surface), and a plurality of concentric Fresnel gratings FPs are arranged at a predetermined grating pitch. La is an optical axis. hea is an effective diameter of the Fresnel lens LF. Fr is a Fresnel annulus in which Fresnel gratings are formed. In FIGS. 27 and 28, h1 represents a length in a direction along the optical axis La (optical axis direction) from a surface vertex FL1 to an end FL2 of the Fresnel lens LF, and hn a length of a wall surface of an n-th Fresnel grating (annulus) counted from the optical axis La.

Each aberration diagram (FIGS. 2, 4, 6, 8, 10, 12, 14, 16, 18, 20, 22, 24, and 26) shows when the observation optical system has a diopter (standard diopter) of −1. The observation optical system according to each example is suitably used for an observation optical system in an image pickup apparatus such as a digital camera and a video camera. In each sectional view showing the lens configuration in the observation optical system (FIGS. 1, 3, 5, 7, 9, 11, 13, 15, 17, 19, 21, 23, and 25), the left side is the image display plane side, and the right side is the observation side.

In each sectional view, L1 represents a first lens unit, L2 represents a second lens unit, L3 represents a third lens unit, L4 represents a fourth lens unit, L5 represents a fifth lens unit, DI represents an image display plane, EP represents an eye point, and CG1 and CG2 each represent a cover glass. The eye point EP may move in the optical axis direction as long as the light ray from the outermost periphery of the image display plane passes through the observer's pupil. A distance from the final surface of the lens to the eye point EP is defined as an eye relief. The cover glasses CG1 and CG2 are plates that protect the image display plane and the lens, and may be provided between the image display plane and the lens unit or between the lens unit and the eye point EP. Since the cover glasses CG1 and CG2 are not essential, they do not have to be provided in the observation optical system.

In each aberration diagram, d and c represent the d-line and C-line, ΔM and ΔS represent a meridional image plane and a sagittal image plane, and a lateral chromatic aberration is based on the C-line. In the optical path diagram and the aberration diagram, an ideal lens having a focal length of about 32 mm is disposed at a position of the eye point EP and forms an image. A wavelength indicates a wavelength of the d-line.

In each example, in adjusting the diopter, the first to second lens units, the first to third lens units, the first to fourth lens units, or the second to fourth lens units are integrally moved along the optical axis. In each example, the diopter is changed from the +side to the −side by moving the lens unit to the observation side. In each example, for example, a single lens, two adjacent lens units, or three lens units can be integrally moved to adjust the diopter.

In Examples 1 to 5, the first lens unit L1 includes a single negative lens. The second lens unit L2 includes a single positive lens. The first lens unit L1 and the second lens unit L2 cause all aberrations since both a pupil paraxial ray and an object paraxial ray pass at high positions. Accordingly, the negative lens is disposed at the position where the paraxial ray of the first lens unit L1 is high and corrects the chromatic aberration and spherical aberration among these aberrations. In addition, the negative refractive power corrects the Petzval sum and controls the curvature of field. The second lens unit L2 having a high object paraxial ray corrects the coma and astigmatism. Such a combination of the positive lens and the negative lens can cancel the asymmetric aberration and facilitates the aberration correction.

In Example 1, the first lens unit L1 and the second lens unit L2 each have an aspherical surface. In Examples 2 to 5, the second lens unit L2 has an aspherical surface. Thereby, the spherical aberration, coma, and curvature of field can be corrected. The second lens unit L2 having a positive refractive power in Example 1 has a Fresnel structure (Fresnel-shaped lens surface). The first lens unit L1 having a negative refractive power in Examples 2 and 5 has a Fresnel structure. The first lens unit L having a negative refractive power and the second lens unit L2 having a positive refractive power in Examples 3 and 4 each have a Fresnel structure. Example 1 may be designed by setting the first lens L1 to a spherical surface. Thereby, an observation optical system that is easy to manufacture can be realized by reducing the difficulty of manufacturing.

In Examples 6 and 7, the first lens unit L1 includes a single positive lens. The second lens unit L2 includes a single negative lens. The third lens unit L3 includes a single positive lens. The second lens unit L2 and the third lens unit L3 cause all aberrations because both a pupil paraxial ray and an object paraxial ray pass at high positions. Accordingly, the negative lens is disposed at a position where the paraxial ray of the second lens unit L2 is high and corrects the chromatic aberration and spherical aberration among these aberrations. In addition, the negative refractive power corrects the Petzval sum and controls the curvature of field. The third lens unit L3 having a high object paraxial ray corrects the coma and astigmatism. Such a combination of the positive lens and the negative lens can cancel the asymmetric aberration and facilitate the aberration correction.

In Examples 6 and 7, the first lens unit L1, the second lens unit L2, and the third lens unit L3 each have an aspherical surface. Thereby, the spherical aberration, coma, and curvature of field can be corrected. The first lens unit L1 having a positive refractive power in Example 6 has a Fresnel structure (Fresnel-shaped lens surface). The third lens unit L3 having a positive refractive power in Example 7 has a Fresnel structure. Examples 6 and 7 may be designed by setting the second lens L2 to a spherical surface. Thereby, an observation optical system that is easy to manufacture can be realized by reducing the difficulty of manufacturing.

In Examples 8 to 11, the first lens unit L1 includes a single positive lens. The second lens unit L2 includes a single negative lens. The third lens unit L3 includes a single positive lens. The fourth lens unit L4 includes a single positive lens. The second lens unit L2, the third lens unit L3, and the fourth lens unit L4 cause all aberrations because both a pupil paraxial ray and an object paraxial ray pass at high positions. Accordingly, the negative lens is disposed at a position where the paraxial ray of the second lens unit L2 is high and corrects the chromatic aberration and spherical aberration among these aberrations. In addition, the negative refractive power corrects the Petzval sum and controls the curvature of field. The third lens unit L3 having a high object paraxial ray corrects the coma and astigmatism. Such a combination of the positive lens and the negative lens can cancel the asymmetric aberration and facilitate the aberration correction.

In Examples 8 and 9, the first lens unit L1, the second lens unit L2, the third lens unit L3, and the fourth lens unit L4 each have an aspherical surface. Thereby, the spherical aberration, coma, and curvature of field can be corrected. The fourth lens unit L4 having a positive refractive power in Example 9 has a Fresnel structure (Fresnel-shaped lens surface). The second lens unit L2 having a negative refractive power in Example 10 has a Fresnel structure. Each of the first lens unit L1 and the second lens unit L2 in Example 11 has a Fresnel structure. Examples 8 to 11 may be designed by setting the second lens unit L2 to a spherical surface. Thereby, an observation optical system that is easy to manufacture can be realized by reducing the difficulty of manufacturing.

In Example 12, the first lens unit L1 includes a single negative lens. The second lens unit L2 includes a single positive lens. The third lens unit L3 includes a single negative lens. The fourth lens unit L4 includes a single positive lens. The fifth lens unit L5 includes a single positive lens. The third lens unit L3 and the fourth lens unit L4 cause all aberrations because both a pupil paraxial ray and an object paraxial ray pass at high positions. Accordingly, the negative lens is disposed at a position where the paraxial ray of the third lens unit L3 is high and corrects the chromatic aberration and spherical aberration among these aberrations. In addition, the negative refractive power corrects the Petzval sum and controls the curvature of field. The fourth lens unit L4 having a high object paraxial ray corrects the coma and astigmatism. Such a combination of the positive lens and the negative lens can cancel the asymmetric aberration and facilitate the aberration correction.

In Example 12, the first lens unit L1, the second lens unit L2, the third lens unit L3, the fourth lens unit L4, and the fifth lens unit L5 each have an aspherical surface. Thereby, the spherical aberration, coma, and curvature of field can be corrected. The first lens unit L1, the second lens unit L2, the fourth lens unit L4, and the fifth lens unit L5 in Example 12 each have a Fresnel structure (Fresnel-shaped lens surface). Example 12 may be designed by setting the third lens unit L3 to a spherical surface. Thereby, an observation optical system that is easy to manufacture can be realized by reducing the difficulty of manufacturing.

In Example 13, the first lens unit L1 includes a single positive lens. The second lens unit L3 includes a single negative lens. The third lens unit L3 includes a single positive lens. The fourth lens unit L4 includes a single positive lens. The fifth lens unit L5 includes a single positive lens. The second lens unit L2, the third lens unit L3, and the fourth lens unit L4 cause all aberrations because both a pupil paraxial ray and an object paraxial ray pass at high positions. Accordingly, the negative lens is disposed at a position where the paraxial ray of the third lens unit L3 is high and corrects the chromatic aberration and spherical aberration among the various aberrations. In addition, the negative refractive power corrects the Petzval sum and controls the curvature of field. The fourth lens unit L4 having a high object paraxial ray corrects the coma and astigmatism. Such a combination of the positive lens and the negative lens can cancel the asymmetric aberration and facilitate the aberration correction.

In Example 13, the first lens unit L1, the second lens unit L2, the third lens unit L3, the fourth lens unit L4, and the fifth lens unit L5 each have an aspherical surface. Thereby, the spherical aberration, coma, and curvature of field can be corrected. The fifth lens unit L5 in Example 13 has a Fresnel structure (Fresnel-shaped lens surface). Example 13 may be designed by setting the second lens unit L2 to a spherical surface. Thereby, an observation optical system that is easy to manufacture can be realized by reducing the difficulty of manufacturing.

A description will now be given of conditions which the observation optical system according to each example satisfies. The observation optical system according to each example includes a negative lens and a positive lens, and at least one of the negative lens and the positive lens has a lens surface (Fresnel surface) having a Fresnel shape. Where $\Phi r$ is a power of the Fresnel-shaped lens surface, $\Phi f$ is a power of the observation optical system as a whole, hsag is a maximum wall length on the Fresnel-shaped lens surface or a step amount (mm), and $\lambda$ is a wavelength of the d-line (mm), the following conditional expressions (1) and (2) are satisfied. When there are a plurality of Fresnel-shaped lens surfaces, the power Φr is the maximum value of the power.

$$0.1 < |\Phi r/\Phi f| 5.0 \quad (1)$$

$$20 < hsag/\lambda < 180 \quad (2)$$

The maximum power Φr of the lens surface in the Fresnel-shaped lens surface is expressed as follows.

(i) When the lens surface is located on the light incident side, $$\phi r = \frac{N' - N}{R} \quad (a)$$

(ii) When the lens surface is located on the light exit side.

$$\phi r = -\frac{N' - N}{R} \quad (b)$$

Here, N' represents a refractive index of a medium on the light exit side of the Fresnel-shaped lens surface. N represents a refractive index of a medium on the light incident side of the Fresnel-shaped lens surface. R is a radius of curvature of the Fresnel-shaped lens surface. When the lens surface is an aspherical surface, the radius of curvature R is a paraxial radius of curvature of the lens surface. A description will now be given of the technical meanings of the conditional expressions (1) and (2). The conditional expression (1) is a conditional expression for properly setting a ratio between the maximum wall length (step amount) of the Fresnel-shaped lens surface and the power of the observation optical system as a whole. If the value is higher than the upper limit in the conditional expression (1), the power of the Fresnel-shaped lens surface becomes too strong, and the lateral chromatic aberration, coma, and curvature of field increase, making it difficult to correct these aberrations. On the other hand, if the value is lower than the lower limit in the conditional expression (1), the power of the Fresnel-shaped lens surface becomes too weak, and a distance on the optical axis from the first lens surface to the eye point EP increases.

The conditional expression (2) is a conditional expression for properly setting a ratio between the maximum wall length (step amount) on the Fresnel-shaped lens surface and the wavelength of the d-line. If the value is higher than the upper limit in the conditional expression (2), the maximum wall length (step amount) of the Fresnel-shaped lens surface becomes too large, and the ratio of light incident on the wall surface increases, so that unnecessary light (ghost) increases and the optical performance deteriorates. On the other hand, when the value is lower than the lower limit in the conditional expression (2), the length (step amount) of the wall surface on the Fresnel-shaped lens surface becomes too small, the intensity of the diffracted light increases, and the optical performance deteriorates.

In order to realize a smaller observation optical system, the observation optical system may satisfy the following conditional expressions (1a) and (2a):

$$0.09 < |\Phi r/\Phi f| < 4.50 \quad (1a)$$

$$23 < hsag/\lambda < 176 \quad (2a)$$

The observation optical system may satisfy the following conditional expressions (1b) and (2b):

$$0.085 < |\Phi r/\Phi f| < 4,000 \quad (1b)$$

$$25.52 < hsag/\lambda < 17.020 \quad (2b)$$

The observation optical system may satisfy at least one of the following conditional expressions (3) to (12):

$$0.01 < |\Phi fl/\Phi f| < 3.00 \quad (3)$$

$$0.02 < \Phi fp/\Phi f < 3.00 \quad (4)$$

$$-0.30 < \Phi fn/\Phi f < -0.20 \quad (5)$$

$$0.05 < Tfd/f < 3.00 \quad (6)$$

$$0.01 < Tfr/f < 0.30 \quad (7)$$

$$0.05 < Yp/f < 0.60 \quad (8)$$

$$0.1 < a\,\tan((\alpha-\beta)/(1-\alpha\beta))*60 < 12.0 \text{ (unit: min)} \quad (9)$$

$$0.2 < |\Phi l|/\Phi f < 6.0 \quad (10)$$

$$1.0 < \Phi lp/\Phi f < 3.0 \quad (11)$$

$$-5.0 < \Phi ln/\Phi f < -0.5 \quad (12)$$

In each of the above conditional expressions, Φfl is a power of a lens having the Fresnel-shaped lens surface, Φfp is a power of a positive lens having the Fresnel-shaped lens surface, and Φfn is a power of a negative lens having the Fresnel-shaped lens surface. The power Φfn is the minimum value of the power when there are a plurality of Fresnel-shaped lens surfaces. Tfd is a distance on the optical axis from a lens surface on the image display plane side of the observation optical system to a lens surface on the observation side of the observation optical system, and Tfr is a thickness on the optical axis of the lens having the Fresnel-shaped lens surface of the observation optical system. f is a focal length of the whole observation optical system, and Yp is half a diagonal length of the image display plane. α=(ep+hsag)/(hea/2) and β=ep/(hea/2) are met, Here, ep is a distance (eye relief) from a final lens surface of the observation optical system (lens closest to the observation position among lenses having refractive powers in the observation optical system) to the eye point EP, and hea is an effective diameter of the Fresnel-shaped lens surface. Φl is a maximum value of the powers of the lenses in the observation optical system, Φlp is the maximum value of the power of the positive lens in the observation optical system, and Φ ln is the maximum value of the power of the negative lens in the observation optical system.

A description will now be given of the technical meanings of the conditional expressions (3) to (12). The conditional expression (3) is a conditional expression for properly setting a ratio of the power of the lens having the Fresnel-shaped lens surface to the power of the whole observation optical system. If the value is higher than the upper limit in the conditional expression (3), the power of the lens having the Fresnel-shaped lens surface becomes too strong, and lateral chromatic aberration, coma, and curvature of field increase, making it difficult to correct these aberrations. On the other hand, when the value is lower than the lower limit in the conditional expression (3), the power of the lens having the Fresnel-shaped lens surface becomes too weak, and a distance on the optical axis from the first lens surface to the eye point EP increases.

The conditional expression (4) is a conditional expression for properly setting a ratio between the power of the positive lens having the Fresnel-shaped lens surface and the power of the whole observation optical system. If the value is higher than the upper limit in the conditional expression (4), the power of the positive lens having the Fresnel-shaped lens surface becomes too strong, and the lateral chromatic aberration, coma, and curvature of field increase, making it difficult to correct these aberrations. On the other hand, when the value is lower than the lower limit in the conditional expression (4), the power of the surface of the positive lens having the Fresnel-shaped lens surface becomes too weak, and a distance on the optical axis from the first lens surface to the eye point EP increases.

The conditional expression (5) is a conditional expression for properly setting a ratio between the power of the negative lens having the Fresnel-shaped lens surface and the power of the whole observation optical system. When the value is higher than the upper limit in the conditional expression (5), the power of the positive lens having the Fresnel-shaped lens surface becomes too weak, and a distance on the optical axis from the first lens surface to the eye point EP increases. On the other hand, when the value is lower than the lower limit in the conditional expression (5), the power of the positive lens having the Fresnel-shaped lens surface becomes too strong, and the lateral chromatic aberration, coma, and curvature of field increase, making it difficult to correct these aberrations.

The conditional expression (6) is a conditional expression for properly setting a ratio between the thickness on the optical axis of the lens having the Fresnel-shaped lens surface in the observation optical system and the focal length of the observation optical system. When the value is higher than the upper limit in the conditional expression (6), the thickness on the optical axis of the lens having the Fresnel-shaped lens surface of the observation optical system excessively increases, and a distance on the optical axis from the first lens surface to the eye point EP increases. On the other hand, if the value is lower than the lower limit in the conditional expression (6), the thickness on the optical axis of the lens having the Fresnel-shaped lens surface in the observation optical system becomes excessively smaller, and it becomes difficult to secure the edge thickness and the center thickness of each lens.

The conditional expression (7) is a conditional expression for properly setting a ratio between the thickness on the optical axis of the lens having the Fresnel-shaped lens surface in the observation optical system and the focal length of the observation optical system. When the value is higher than the upper limit in the conditional expression (7), the thickness on the optical axis of the lens having the Fresnel-shaped lens surface of the observation optical system excessively increases, and a distance on the optical axis from the first lens surface to the eye point EP increases. On the other hand, if the value is lower than the lower limit in the conditional expression (7), it becomes difficult to secure the edge thickness and the center thickness.

The conditional expression (8) is a conditional expression for properly setting a ratio between the half of the diagonal length of the image display plane and the focal length of the observation optical system. If the value is higher than the upper limit in the conditional expression (8), the focal length of the observation optical system becomes too short, and the lateral chromatic aberration, coma, and curvature of field increase, making it difficult to correct these aberrations. On the other hand, if the value is lower than the lower limit in the conditional expression (8), it becomes difficult to obtain a desired angle of view.

The conditional expression (9) is a conditional expression for properly setting a relationship among the distance (eye relief) from the final lens surface of the observation optical system to the eye point EP, the effective diameter of the lens having the Fresnel-shaped lens surface, and the maximum wall length (step amount). When the value is higher than the upper limit in the conditional expression (9), the ratio of the light incident on the wall surface increases, consequently unnecessary light increases, and the optical performance deteriorates. On the other hand, when the value is lower than the lower limit in the conditional expression (9), the amount of the maximum wall surface length (step amount) in the lens having the Fresnel-shaped lens surface becomes too small, the intensity of the diffracted light increases, and the optical performance deteriorates.

The conditional expression (10) is a conditional expression for properly setting a ratio between the power of the lens of the observation optical system and the power of the whole observation optical system. If the value is higher than the upper limit in the conditional expression (10), the power of the lens of the observation optical system becomes too strong, and the lateral chromatic aberration, coma, and curvature of field increase, making it difficult to correct these aberrations. On the other hand, when the value is lower than the lower limit in the conditional expression (10), the power of the lens having the Fresnel-shaped lens surface becomes too weak, and a distance on the optical axis from the first lens surface to the eye point EP increases.

The conditional expression (11) is a conditional expression for properly setting a ratio between the power of the positive lens in the observation optical system and the power of the whole observation optical system. If the value is higher than the upper limit in the conditional expression (11), the power of the lens having the Fresnel-shaped lens surface becomes too strong, and the lateral chromatic aberration, coma, and curvature of field increase, making it difficult to correct these aberrations. On the other hand, when the value is lower than the lower limit in the conditional expression (11), the power of the lens having the Fresnel-shaped lens surface becomes too weak, and a distance on the optical axis from the first lens surface to the eye point EP increases.

The conditional expression (12) is a conditional expression for properly setting a ratio between the power of the negative lens in the observation optical system and the power of the whole observation optical system. When the value is higher than the upper limit in the conditional expression (12), the power of the lens having the Fresnel-shaped lens surface becomes too weak, and a distance on the optical axis from the first lens surface to the eye point EP increases. On the other hand, when the value is lower than the lower limit in the conditional expression (12), the power of the lens having a Fresnel-shaped lens surface becomes too strong, and the lateral chromatic aberration, coma, and curvature of field increase, making it difficult to correct these aberrations.

The observation optical system may satisfy at least one of the following conditional expressions (3a) to (12a):

$$0.04<|\Phi fl/\Phi f|<2.50 \tag{3a}$$

$$0.04<\Phi fp/\Phi f<2.40 \tag{4a}$$

$$-2.40<\Phi fn/\Phi f<-0.60 \tag{5a}$$

$0.1 < Tfd/f < 2.20$ (6a)

$0.03 < Tfr/f < 0.2$ (7a)

$0.13 < Yp/f < 0.50$ (8a)

$0.4 < a\ \tan((\alpha-\beta)/(1-\alpha\beta))*60 < 9.9$ (unit: min) (9a)

$0.66 < |\Phi l|/\Phi f < 5.0$ (10a)

$0.96 < \Phi flp/\Phi f < 2.7$ (11a)

$-4.43 < \Phi fln/\Phi f < -0.7$ (12a)

The observation optical system may satisfy at least one of the following conditional expressions (3b) to (12b):

$0.076 < |\Phi fl/\Phi f| < 1.813$ (3b)

$0.076 < \Phi fp/\Phi f < 1.783$ (4b)

$-1.813 < \Phi fn/\Phi f < -0.892$ (5b)

$0.151 < Tfd/f < 1.34$ (6b)

$0.066 < Tfr/f < 0.102$ (7b)

$0.221 < Yp/f < 0.358$ (8b)

$0.715 < a\ \tan((\alpha-\beta)/(1-\alpha\beta))*60 < 7.74$ (unit: min) (9b)

$1.127 < |\Phi l|/\Phi f < 3.878$ (10b)

$0.931 < \Phi lp/\Phi f < 2.292$ (11b)

$-3.878 < \Phi ln/\Phi f < -0.858$ (12b)

The observation optical system according to each example may correct the distortion and lateral chromatic aberration among various aberrations by electrical image processing.

A description will now be given of Numerical Examples 1 to 16 corresponding to Examples 1 to 16 of the present invention. In each numerical example, a surface number is counted in order from the image display plane side, r represents a radius of curvature, d represents an interval, nd and vd represent a refractive index and an Abbe number based on the d-line, respectively. The Abbe number vd of a certain material is expressed as vd=(Nd−1)/(NF−NC) where Nd, NF, NC, and Ng are refractive indexes for the d-line (587.6 nm), F-line (486.1 nm), C-line (656.3 nm), and g-line (wavelength 435.8 nm) in the Fraunhofer line. In each numerical example, two surfaces closest to the image are planes corresponding to the optical block G. K is a conical constant, and A4, A6, A8, and A10 are fourth-order, sixth-order, eighth-order, and tenth-order aspherical coefficients, respectively. An aspherical surface is labeled with * to the right of the surface number.

The aspherical shape is expressed as $x=(h^2/r)/[1+\{1-(1+K)(h/r)^2\}^{1/2}]+A4\cdot h^4+A6\cdot h^6+A8\cdot h^8+A10\cdot h^{10}$, where x is a displacement in the optical axis direction at a height h from the optical axis based on the surface vertex. r represents a paraxial radius of curvature. For example, an expression of "e-Z" means "$10^{-Z}$". The Fresnel surface (Fresnel-shaped lens surface) represents an ideal small thickness state having an aspherical effect, and the actual shape has a Fresnel shape within the described center thickness d. The Fresnel surface is written as fre to the right of the surface number. Tables 1 to 12 show a correspondence between each of the above conditional expressions and each numerical example.

NUMERICAL EXAMPLE 1

UNIT: mm
OVERALL SPECIFICATION

| | |
|---|---|
| Focal Length: | 21.89 |
| Display diagonal length: | 9.98 |
| 2ω[deg] | 26.17 |

Surface Data

| Surface No. | r | d | nd | vd | Effective diameter |
|---|---|---|---|---|---|
| 1 | ∞ | 0.7 | 1.52310 | 65.0 | 20.0 |
| 2 | ∞ | 1.35 | | | 20.0 |
| 3 | ∞ | 0.8 | 1.49171 | 57.4 | 20.0 |
| 4 | ∞ | (Variable) | | | 20.0 |
| 5* | −11.8870 | 1.7 | 1.63550 | 23.9 | 10.0 |
| 6 | −61.5263 | 0.1 | | | 10.7 |
| 7*fre | 14.5041 | 1.501 | 1.53160 | 55.8 | 11.0 |
| 8*fre | −11.4468 | (Variable) | | | 11.0 |
| 9 | ∞ | 0.8 | 1.49171 | 57.4 | 10.5 |
| 10 | ∞ | 16.0 | | | 10.4 |
| EP | | | | | 7.5 |

ASPHERIC DATA

5th Surface

K = 0.0 A4 = 1.06325e−004

7th Surface

K = 0.0 A4 = −2.95063e−004 A6 = 8.34934e−006 A8 = −1.73516e−007 A10 = 1.81211e−009

8th Surface

K = 0.0 A4 = 9.19120e−005 A6 = 1.93888e−006

VARIABLE INTERVAL

| | 0dptr | +1dptr | −1dptr |
|---|---|---|---|
| D4 | 16.232 | 16.762 | 15.794 |
| D8 | 2.696 | 2.167 | 3.134 |

Length of wall surface in Fresnel grating A h1: 0.05
Length of wall surface in Fresnel grating A hn: 0.05
Length of wall surface in Fresnel grating B h1: 0.08
Length of wall surface in Fresnel grating B hn: 0.08

NUMERICAL EXAMPLE 2

UNIT: mm
OVERALL SPECIFICATION

| | |
|---|---|
| Focal Length: | 21.82 |
| Display diagonal length: | 9.98 |
| 2ω[deg] | 26.16 |

Surface Data

| Surface No. | r | d | nd | vd | Effective diameter |
|---|---|---|---|---|---|
| 1 | ∞ | 0.7 | 1.52310 | 65.0 | 20.0 |
| 2 | ∞ | 1.35 | | | 20.0 |
| 3 | ∞ | 0.8 | 1.49171 | 57.4 | 20.0 |
| 4 | ∞ | (Variable) | | | 20.0 |
| 5fre | −11.2667 | 1.7 | 1.63550 | 23.9 | 10.0 |
| 6fre | −58.1379 | 0.1 | | | 10.7 |

-continued

| | | | | | |
|---|---|---|---|---|---|
| 7* | 15.8160 | 3.795 | 1.53160 | 55.8 | 11.0 |
| 8* | −10.5072 | (Variable) | | | 11.0 |
| 9 | ∞ | 0.8 | 1.49171 | 57.4 | 10.5 |
| 10 | ∞ | 16.0 | | | 10.4 |
| EP | | | | | 7.5 |

ASPHERIC DATA

7th Surface

K = 0.0 A4 = −1.94884e−004 A6 = 4.16216e−006 A8 = −1.44112e−007
A10 = 1.61792e−009

8th Surface

K = 0.0 A4 = 9.93356e−005 A6 = −2.89266e−007

VARIABLE INTERVAL

| | 0dptr | +1dptr | −1dptr |
|---|---|---|---|
| D4 | 14.469 | 14.997 | 14.036 |
| D10 | 1.185 | 0.657 | 1.619 |

Length of wall surface in Fresnel grating A h1: 0.04
Length of wall surface in Fresnel grating A hn: 0.04
Length of wall surface in Fresnel grating B h1: 0.07
Length of wall surface in Fresnel grating B hn: 0.07

NUMERICAL EXAMPLE 3

UNIT: mm
OVERALL SPECIFICATION

| | |
|---|---|
| Focal Length: | 21.80 |
| Display diagonal length: | 9.98 |
| 2ω[deg] | 26.16 |

Surface Data

| Surface No. | r | d | nd | vd | Effective diameter |
|---|---|---|---|---|---|
| 1 | ∞ | 1.5 | 1.52310 | 65.0 | 20.0 |
| 2 | ∞ | 1.35 | | | 20.0 |
| 3 | ∞ | (Variable) | | | 20.0 |
| 4fre | −9.6061 | 1.7 | 1.63550 | 23.9 | 10.0 |
| 5fre | −26.9385 | 0.3 | | | 10.7 |
| 6*fre | 20.7423 | 1.5011 | 1.53160 | 55.8 | 11.0 |
| 7*fre | −9.8387 | (Variable) | | | 11.0 |
| 8 | ∞ | 0.8 | 1.49171 | 57.4 | 10.5 |
| 9 | ∞ | 16.0 | | | 10.4 |
| EP | | | | | 7.5 |

6th Surface

K = 0.0 A4 = −2.47882e−004 A6 = 9.35287e−006 A8 = −1.90201e−007
A10 = 1.96341e−009

7th Surface

K = 0.0 A4 = −1.14659e−006 A6 = 3.23812e−006

VARIABLE INTERVAL

| | 0dptr | 1dptr | −1dptr |
|---|---|---|---|
| D3 | 15.452 | 15.978 | 15.018 |
| D7 | 2.636 | 2.110 | 3.070 |

Length of wall surface in Fresnel grating A h1: 0.034
Length of wall surface in Fresnel grating A hn: 0.034
Length of wall surface in Fresnel grating B h1: 0.065
Length of wall surface in Fresnel grating B hn: 0.065

NUMERICAL EXAMPLE 4

UNIT: mm
OVERALL SPECIFICATION

| | |
|---|---|
| Focal Length: | 21.78 |
| Display diagonal length: | 9.98 |
| 2ω[deg] | 26.16 |

Surface Data

| Surface No. | r | d | nd | vd | Effective diameter |
|---|---|---|---|---|---|
| 1 | ∞ | 1.5 | 1.52310 | 65.0 | 20.0 |
| 2 | ∞ | 1.35 | | | 20.0 |
| 3 | ∞ | (Variable) | | | 20.0 |
| 4fre | −11.8756 | 1.7 | 1.63550 | 23.9 | 10.0 |
| 5 | −47.5094 | 0.1 | | | 10.7 |
| 6*fre | 16.7894 | 1.5014 | 1.53160 | 55.8 | 11.0 |
| 7*fre | −10.9428 | (Variable) | | | 11.0 |
| 8 | ∞ | 0.8 | 1.49171 | 57.4 | 10.5 |
| 9 | ∞ | 16.0 | | | 10.4 |
| EP | | | | | 7.5 |

6th Surface

K = 0.0 A4 = −3.08279e−004 A6 = 1.04626e−005 A8 = −1.94268e−007
A10 = 2.03695e−009

7th Surface

K = 0.0 A4 = −4.77431e−005 A6 = 3.86916e−006

VARIABLE INTERVAL

| | 0dptr | 1dptr | −1dptr |
|---|---|---|---|
| D4 | 16.093 | 16.618 | 15.660 |
| D10 | 2.623 | 2.097 | 3.055 |

Length of wall surface in Fresnel grating A h1: 0.048
Length of wall surface in Fresnel grating A hn: 0.048
Length of wall surface in Fresnel grating B h1: 0.08
Length of wall surface in Fresnel grating B hn: 0.08

NUMERICAL EXAMPLE 5

UNIT: mm
OVERALL SPECIFICATION

| | |
|---|---|
| Focal Length: | 21.80 |
| Display diagonal length: | 9.98 |
| 2ω[deg] | 26.16 |

Surface Data

| Surface No. | r | d | nd | vd | Effective diameter |
|---|---|---|---|---|---|
| 1 | ∞ | 0.7 | 1.52310 | 65.0 | 20.0 |
| 2 | ∞ | 1.35 | | | 20.0 |
| 3 | ∞ | 0.8 | 1.49171 | 57.4 | 20.0 |
| 4 | ∞ | (Variable) | | | 20.0 |
| 5fre | −9.8384 | 1.7 | 1.63550 | 23.9 | 10.0 |
| 6 | −35.4628 | 0.1 | | | 10.7 |
| 7* | 17.8086 | 3.8008 | 1.53160 | 55.8 | 11.0 |
| 8* | −9.8996 | (Variable) | | | 11.0 |
| 9 | ∞ | 0.8 | 1.49171 | 57.4 | 10.5 |
| 10 | ∞ | 16.0 | | | 10.4 |
| EP | | | | | 7.5 |

-continued

7th Surface

K = 0.0 A4 = −1.60262e−004 A6 = 3.66117e−006 A8 = −1.39628e−007 A10 = 1.58356e−009

8th Surface

K = 0.0 A4 = 1.09095e−004 A6 = −2.78560e−007

VARIABLE INTERVAL

|    | 0dptr  | +1 dptr | −1 dptr |
|----|--------|---------|---------|
| D4 | 14.160 | 14.687  | 13.727  |
| D8 | 1.089  | 0.562   | 1.522   |

Length of wall surface in Fresnel grating A h1: 0.035
Length of wall surface in Fresnel grating A hn: 0.035
Length of wall surface in Fresnel grating B h1: 0.068
Length of wall surface in Fresnel grating B hn: 0.068

NUMERICAL EXAMPLE 6

UNIT: mm
OVERALL SPECIFICATION

| Focal Length:          | 16.09 |
| Display diagonal length: | 9.98  |
| 2ω[deg]                | 34.15 |

Surface Data

| Surface No. | r         | d          | nd      | vd   | Effective diameter |
|-------------|-----------|------------|---------|------|--------------------|
| 1           | ∞         | 1.2        | 1.51680 | 64.2 | 20.0               |
| 2           | ∞         | 4.0        |         |      | 20.0               |
| 3           | ∞         | (Variable) |         |      | 20.0               |
| 4fre        | 31.1922   | 1.5001     | 1.85135 | 40.1 | 14.3               |
| 5*fre       | −16.0024  | 3.3887     |         |      | 14.3               |
| 6*          | −8.4382   | 2.7        | 1.63550 | 23.9 | 14.5               |
| 7           | 166.0096  | 0.554      |         |      | 16.5               |
| 8           | 29.0269   | 6.5        | 1.53480 | 55.7 | 17.7               |
| 9*          | −10.0612  | (Variable) |         |      | 17.7               |
| 10          | ∞         | 0.8        | 1.49171 | 57.4 | 20.0               |
| 11          | ∞         | 19.0       |         |      | 20.0               |
| EP          |           |            |         |      | 9.0                |

5th Surface

K = 2.07138e+000 A4 = 1.34595e−004 A6 = 8.71566e−007

6th Surface

K = −1.24408e+000 A4 = −1.60114e−004

9th Surface

K = −2.37653e+000 A4 = −1.56240e−004 A6 = 1.01492e−006 A8 = −2.12223e−009

|    | 0dptr  | 1dptr  | −1dptr |
|----|--------|--------|--------|
| D3 | 3.832  | 4.062  | 3.541  |
| D9 | 1.000  | 0.770  | 1.291  |

Length of wall surface in Fresnel grating A h1: 0.053
Length of wall surface in Fresnel grating A hn: 0.053
Length of wall surface in Fresnel grating B h1: 0.09
Length of wall surface in Fresnel grating B hn: 0.09

NUMERICAL EXAMPLE 7

UNIT: mm
OVERALL SPECIFICATION

| Focal Length:          | 16.25 |
| Display diagonal length: | 9.98  |
| 2ω[deg]                | 34.15 |

Surface Data

| Surface No. | r         | d          | nd      | vd   | Effective diameter |
|-------------|-----------|------------|---------|------|--------------------|
| 1           | ∞         | 1.2        | 1.51680 | 64.2 | 20.0               |
| 2           | ∞         | 4.0        |         |      | 20.0               |
| 3           | ∞         | (Variable) |         |      | 20.0               |
| 4           | 360.5328  | 3.98       | 1.85135 | 40.1 | 14.3               |
| 5*          | −10.741   | 3.4941     |         |      | 14.3               |
| 6*          | −3.9583   | 2.7        | 1.63550 | 23.9 | 14.5               |
| 7           | −24.0245  | 1.1973     |         |      | 16.5               |
| 8*fre       | 15.7773   | 1.5013     | 1.53480 | 55.7 | 17.7               |
| 9*fre       | −8.5918   | (Variable) |         |      | 17.7               |
| 10          | ∞         | 0.8        | 1.49171 | 57.4 | 20.0               |
| 11          | ∞         | 19.0       |         |      | 20.0               |
| EP          |           |            |         |      | 9.0                |

5th Surface

K = 0.0 A4 = 1.41723e−004 A6 = 8.71566e−007

6th Surface

K = −1.58996e+000 A4 = −4.43891e−005

8th Surface

K = 0.0 A4 = −2.16380e−004 A6 = 1.23073e−006

9th Surface

K = −2.37653e+000 A4 = 2.80757e−004 A6 = −6.01656e−006 A8 = 7.36244e−008 A10 = −3.23183e−010

VARIABLE INTERVAL

|    | 0dptr  | 1dptr  | −1dptr |
|----|--------|--------|--------|
| D3 | 2.653  | 2.888  | 2.356  |
| D9 | 1.000  | 0.765  | 1.296  |

Length of wall surface in Fresnel grating A h1: 0.05
Length of wall surface in Fresnel grating A hn: 0.05
Length of wall surface in Fresnel grating B h1: 0.08
Length of wall surface in Fresnel grating B hn: 0.08

NUMERICAL EXAMPLE 8

UNIT: mm
OVERALL SPECIFICATION

| Focal Length:          | 19.00 |
| Display diagonal length: | 12.87 |
| 2ω[deg]                | 37.40 |

Surface Data

| Surface No. | r        | d          | nd      | vd   | Effective diameter |
|-------------|----------|------------|---------|------|--------------------|
| 1           | ∞        | 1.2        | 1.52100 | 65.1 | 15.5               |
| 2           | ∞        | 4.0        |         |      | 15.5               |
| 3           | ∞        | (Variable) |         |      | 15.5               |
| 4fre        | 35.0816  | 1.5        | 1.53480 | 56.0 | 16.0               |
| 5*fre       | −15.3885 | 4.1534     |         |      | 16.0               |
| 6*          | −9.0437  | 1.9        | 1.65100 | 21.5 | 16.0               |
| 7*          | −55.8029 | 0.3        |         |      | 21.0               |

| | | | | | |
|---|---|---|---|---|---|
| 8 | 1182.3437 | 6.6 | 1.76802 | 49.2 | 21.7 |
| 9* | −14.4515 | 0.3 | | | 21.7 |
| 10 | −38.6615 | 1.9 | 1.53480 | 56.0 | 21.0 |
| 11* | −20.3385 | (Variable) | | | 21.0 |
| 12 | ∞ | 0.8 | 1.49171 | 57.4 | 20.0 |
| 13 | ∞ | 23.0 | | | 20.0 |
| EP | | | | | 10.0 |

5th Surface

K = −1.90130e+000 A4 = 1.44492e−004 A6 = −1.56292e−006
A8 = 1.24662e−008

6th Surface

K = −1.09467e+000 A4 = 2.56093e−005 A6 = −4.44964e−006
A8 = 5.09270e−008 A10 = −4.41561e−010

7th Surface

K = −4.63251e−001 A4 = 3.88818e−005 A6 = −1.72257e−007
A8 = 3.11891e−010

9th Surface

K = −2.08074e+000 A4 = −8.72954e−005 A6 = 2.69143e−007
A8 = −1.93777e−009 A10 = 4.42260e−012

11th Surface

K = −9.75863e+000 A4 = −7.63496e−005 A6 = 1.44143e−007
A8 = 6.49972e−010 A10 = −3.70039e−012

VARIABLE INTERVAL

| | 0dptr | 2dptr | −1dptr |
|---|---|---|---|
| D3 | 3.936 | 4.659 | 3.576 |
| D11 | 1.760 | 1.038 | 2.121 |

Length of wall surface in Fresnel grating A h1: 0.06
Length of wall surface in Fresnel grating A hn: 0.06
Length of wall surface in Fresnel grating B h1: 0.1
Length of wall surface in Fresnel grating B hn: 0.1

NUMERICAL EXAMPLE 9

UNIT: mm
OVERALL SPECIFICATION

| Focal Length: | 19.04 |
|---|---|
| Display diagonal length: | 12.87 |
| 2ω[deg] | 37.40 |

Surface Data

| Surface No. | r | d | nd | vd | Effective diameter |
|---|---|---|---|---|---|
| 1 | ∞ | 1.2 | 1.52100 | 65.1 | 15.5 |
| 2 | ∞ | 4.0 | | | 15.5 |
| 3 | ∞ | (Variable) | | | 15.5 |
| 4 | 176.4372 | 5.06 | 1.53480 | 56.0 | 16.0 |
| 5* | −9.6425 | 2.83 | | | 16.0 |
| 6* | −6.8394 | 1.9 | 1.65100 | 21.5 | 16.0 |
| 7* | −25.541 | 0.3 | | | 21.0 |
| 8 | −73.8443 | 6.6 | 1.76802 | 49.2 | 21.7 |
| 9* | −12.0165 | 0.3 | | | 21.7 |
| 10fre | 117.3179 | 1.5 | 1.53480 | 56.0 | 21.0 |
| 11*fre | −1701.0019 | (Variable) | | | 21.0 |
| 12 | ∞ | 0.8 | 1.49171 | 57.4 | 20.0 |
| 13 | ∞ | 23.0 | | | 20.0 |
| EP | | | | | 10.0 |

5th Surface

K = −1.45977e−001 A4 = 2.72146e−004 A6 = −1.73561e−006
A8 = 2.19236e−008

6th Surface

K = −1.09467e+000 A4 = 2.56093e−005 A6 = −4.44964e−006
A8 = 5.09270e−008 A10 = −4.41561e−010

7th Surface

K = −4.63251e−001 A4 = 3.88818e−005 A6 = −1.72257e−007
A8 = 3.11891e−010

9th Surface

K = −2.08074e+000 A4 = −8.72954e−005 A6 = 2.69143e−007
A8 = −1.93777e−009 A10 = 4.42260e−012

11th Surface

K = −2.28176e+006 A4 = −1.19689e−005 A6 = −4.67141e−007
A8 = 5.52036e−009 A10 = −1.99171e−011

VARIABLE INTERVAL

| | 0dptr | 2dptr | −1dptr |
|---|---|---|---|
| D3 | 2.989 | 3.718 | 2.627 |
| D11 | 1.487 | 0.758 | 1.849 |

Length of wall surface in Fresnel grating A h1: 0.05
Length of wall surface in Fresnel grating A hn: 0.05
Length of wall surface in Fresnel grating B h1: 0.09
Length of wall surface in Fresnel grating B hn: 0.09

NUMERICAL EXAMPLE 10

UNIT: mm
OVERALL SPECIFICATION

| Focal Length: | 18.63 |
|---|---|
| Display diagonal length: | 12.87 |
| 2ω[deg] | 37.40 |

Surface Data

| Surface No. | r | d | nd | vd | Effective diameter |
|---|---|---|---|---|---|
| 1 | ∞ | 1.2 | 1.52100 | 65.1 | 15.5 |
| 2 | ∞ | 4.0 | | | 15.5 |
| 3 | ∞ | (Variable) | | | 15.5 |
| 4 | 53.3049 | 5.06 | 1.53480 | 56.0 | 16.0 |
| 5* | −12.5161 | 2.83 | | | 16.0 |
| 6* | −8.6235 | 1.9 | 1.65100 | 21.5 | 16.0 |
| 7*fre | −70.5875 | 0.3 | | | 21.0 |
| 8 | 311.0313 | 7.0 | 1.76802 | 49.2 | 21.7 |
| 9* | −14.8901 | 0.3 | | | 21.7 |
| 10 | −53.539 | 2.7 | 1.53480 | 56.0 | 21.0 |
| 11* | −20.9022 | (Variabe) | | | 21.0 |
| 12 | ∞ | 0.8 | 1.49171 | 57.4 | 20.0 |
| 13 | ∞ | 23.0 | | | 20.0 |
| EP | | | | | 10.0 |

5th Surface

K = −1.45977e−001 A4 = 2.72146e−004 A6 = −1.73561e−006
A8 = 2.19236e−008

6th Surface

K = −1.09467e+000 A4 = 2.56093e−005 A6 = −4.44964e−006
A8 = 5.09270e−008 A10 = −4.41561e−010

7th Surface

K = −4.63251e−001 A4 = 3.88818e−005 A6 = −1.72257e−007
A8 = 3.11891e−010

9th Surface

K = −2.08074e+000 A4 = −8.72954e−005 A6 = 2.69143e−007
A8 = −1.93777e−009 A10 = 4.42260e−012

-continued

11th Surface

K = −9.75863e+000 A4 = −7.63496e−005 A6 = 1.44143e−007
A8 = 6.49972e−010 A10 = −3.70039e−012

VARIABLE INTERVAL

|     | 0dptr | 2dptr | −1dptr |
|-----|-------|-------|--------|
| D3  | 1.581 | 2.273 | 1.233  |
| D11 | 4.767 | 4.075 | 5.115  |

Length of wall surface in Fresnel grating A h1: 0.09
Length of wall surface in Fresnel grating A hn: 0.09
Length of wall surface in Fresnel grating B h1: 0.1
Length of wall surface in Fresnel grating B hn: 0.1

NUMERICAL EXAMPLE 11

UNIT: mm
OVERALL SPECIFICATION

| Focal Length:          | 18.83 |
| Display diagonal length: | 12.87 |
| 2ω[deg]                | 37.40 |

Surface Data

| Surface No. | r | d | nd | vd | Effective diameter |
|---|---|---|---|---|---|
| 1 | ∞ | 1.2 | 1.52100 | 65.1 | 15.5 |
| 2 | ∞ | 4.0 | | | 15.5 |
| 3 | ∞ | (Variable) | | | 15.5 |
| 4fre | −83.7739 | 1.5 | 1.53480 | 56.0 | 16.0 |
| 5*fre | −9.1108 | 2.1818 | | | 16.0 |
| 6*fre | −7.9417 | 1.9 | 1.65100 | 21.5 | 16.0 |
| 7*fre | −123.7592 | 0.3 | | | 21.0 |
| 8 | 201.5594 | 8.4938 | 1.76802 | 49.2 | 21.7 |
| 9* | −16.5682 | 0.3 | | | 21.7 |
| 10 | −125.9546 | 4.705 | 1.53480 | 56.0 | 21.0 |
| 11* | −19.5914 | (Variable) | | | 21.0 |
| 12 | ∞ | 0.8 | 1.49171 | 57.4 | 20.0 |
| 13 | ∞ | 23.0 | | | 20.0 |
| EP | | | | | 10.0 |

5th Surface

K = −7.79739e+000 A4 = −4.73562e−004 A6 = 4.06421e−006
A8 = 2.58803e−008
6th Surface K = −4.79729e+000 A4 = −6.05517e−004 A6 = 2.42123e−006
A8 = 5.09270e−008 A10 = −4.41561e−010
7th Surface K = 0.0 A4 = 1.19583e−004 A6 = −8.70038e−007 A8 = 3.11891e−010
9th Surface K = −2.08074e+000 A4 = −1.14944e−004 A6 = 3.43704e−007
A8 = −1.93777e−009 A10 = 4.42260e−012
11th Surface K = −9.75863e+000 A4 = −7.63496e−005 A6 = 1.44143e−007
A8 = 6.49972e−010 A10 = −3.70039e−012

VARIABLE INTERVAL

|     | 0dptr | 2dptr | −1dptr |
|-----|-------|-------|--------|
| D3  | 2.205 | 2.920 | 1.852  |
| D11 | 1.000 | 0.285 | 1.353  |

Length of wall surface in Fresnel grating A h1: 0.03
Length of wall surface in Fresnel grating A hn: 0.03

-continued

Length of wall surface in Fresnel grating B h1: 0.063
Length of wall surface in Fresnel grating B hn: 0.063

NUMERICAL EXAMPLE 12

UNIT: mm
OVERALL SPECIFICATION

| Focal Length:          | 22.57 |
| Display diagonal length: | 9.98 |
| 2ω[deg]                | 25.42 |

Surface Data

| Surface No. | r | d | nd | vd | Effective diameter |
|---|---|---|---|---|---|
| 1 | ∞ | 0.7 | 1.51680 | 64.2 | 10.0 |
| 2 | ∞ | 1.8825 | | | 9.9 |
| 3 | ∞ | 1.5 | 1.48749 | 70.4 | 9.3 |
| 4*fre | 25.8763 | (Variable) | | | 9.0 |
| 5fre | −4.657 | 1.4986 | 1.74397 | 44.9 | 7.9 |
| 6*fre | −4.2025 | 2.0916 | | | 9.4 |
| 7* | −5.5419 | 2.0 | 1.68190 | 31.3 | 9.3 |
| 8 | 16.0227 | 1.2716 | | | 11.0 |
| 9fre | 15.117 | 1.5004 | 1.64838 | 55.4 | 11.4 |
| 10*fre | −10.6245 | (Variable) | | | 11.9 |
| 11*fre | 18.6506 | 1.0 | 1.56069 | 63.9 | 10.6 |
| 12 | ∞ | 19.0 | | | 10.3 |
| EP | | | | | 4.2 |

4th Surface

K = 0.0 A4 = 3.26544e−004 A6 = −2.58067e−005
6th Surface

K = −5.04712e−001 A4 = 1.55251e−004 A6 = 8.71566e−007
7th Surface

K = −1.24408e+000 A4 = −1.60114e−004
10th Surface

K = −2.37653e+000 A4 = −1.56240e−004 A6 = 1.01492e−006
A8 = −2.12223e−009
11th Surface K = 0.0 A4 = −1.20623e−004 A6 = 1.29036e−006

VARIABLE INTERVAL

|     | 0dptr | 1dptr | −1dptr |
|-----|-------|-------|--------|
| D4  | 5.240 | 5.927 | 4.392  |
| D10 | 4.411 | 3.724 | 5.259  |

Length of wall surface in Fresnel grating A h1: 0.015
Length of wall surface in Fresnel grating A hn: 0.015
Length of wall surface in Fresnel grating B h1: 0.035
Length of wall surface in Fresnel grating B hn: 0.035

NUMERICAL EXAMPLE 13

UNIT: mm
OVERALL SPECIFICATION

| Focal Length:          | 17.45 |
| Display diagonal length: | 12.48 |
| 2ω[deg]                | 38.82 |

-continued

Surface Data

| Surface No. | r | d | nd | vd | Effective diameter |
|---|---|---|---|---|---|
| 1 | ∞ | 1.2 | 1.52100 | 65.1 | 20.0 |
| 2 | ∞ | 4.0 | | | 20.0 |
| 3 | ∞ | (Variable) | | | 20.0 |
| 4 | 38.776 | 6.3687 | 1.81600 | 46.6 | 20.2 |
| 5* | −12.5871 | 3.5857 | | | 20.4 |
| 6* | −6.6567 | 1.9 | 1.80810 | 22.8 | 18.7 |
| 7 | −32.3748 | 0.3 | | | 22.2 |
| 8 | −57.5405 | 4.834 | 1.81600 | 46.6 | 22.7 |
| 9* | −10.639 | 0.3 | | | 23.3 |
| 10 | −25.5308 | 2.9964 | 1.51633 | 64.1 | 23.2 |
| 11* | −23.8389 | (Variable) | | | 23.6 |
| 12*fre | 96.2992 | 1.5 | 1.49171 | 57.4 | 19.6 |
| 13* | 648.2457 | 23.0 | | | 19.0 |
| EP | | | | | 10.0 |

5th Surface

K = −1.08884e+000 A4 = 8.42000e−005 A6 = −8.15000e−007
A8 = 5.98000e−009 A10 = −2.31000e−011

6th Surface

K = −9.03298e−001 A4 = 1.76342e−004 A6 = −6.18000e−007
A8 = −1.99000e−011 A10 = 1.23000e−011

9th Surface

K = −1.06676e+000 A4 = 9.97000e−005 A6 = −1.37000e−007
A8 = −1.31000e−009 A10 = 9.42000e−012

11th Surface

K = 0.0 A4 = −1.25046e−004 A6 = 7.77000e−007 A8 = −2.66000e−009

12th Surface

K = 0.0 A4 = −4.76149e−006 A6 = 3.10404e−007 A8 = −8.18407e−010

13th Surface

K = 0.0 A4 = 0.0 A6 = 1.81911e−007

VARIABLE INTERVAL

| | 0dptr | 2dptr | −1dptr |
|---|---|---|---|
| D3 | 2.334 | 2.930 | 2.022 |
| D11 | 1.595 | 1.000 | 1.905 |

Length of wall surface in Fresnel grating A h1: 0.050
Length of wall surface in Fresnel grating A hn: 0.050
Length of wall surface in Fresnel grating B h1: 0.1
Length of wall surface in Fresnel grating B hn: 0.1

TABLE 1

| Condi. Exp. | ex1 | ex2 | ex3 | ex4 |
|---|---|---|---|---|
| 1 | 1.017 | 1.231 | 1.442 | 1.058 |
| 3 | 1.783 | 0.978 | 0.892 | 1.715 |
| 4 | 1.783 | — | — | 1.715 |
| 5 | — | −0.978 | −0.892 | − |
| 6 | 0.151 | 0.256 | 0.161 | 0.152 |
| 7 | 0.089 | 0.078 | 0.078 | 0.069 |
| 8 | 0.228 | 0.229 | 0.229 | 0.229 |
| 10 | 1.783 | 1.746 | 1.707 | 1.715 |
| 11 | 1.783 | 1.746 | 1.707 | 1.715 |
| 12 | −0.932 | −0.978 | −0.892 | −0.858 |

TABLE 2

| Condi. Exp. | ex5 | ex6 | ex7 |
|---|---|---|---|
| 1 | 1.400 | 0.856 | 1.012 |
| 3 | 0.991 | 1.276 | 1.529 |
| 4 | — | 1.276 | 1.529 |
| 5 | −0.991 | — | — |
| 6 | 0.257 | 0.910 | 0.792 |
| 7 | 0.078 | 0.093 | 0.092 |
| 8 | 0.229 | 0.310 | 0.307 |
| 10 | 1.735 | 1.281 | 2.066 |
| 11 | 1.735 | 1.276 | 1.529 |
| 12 | −0.991 | −1.281 | −2.066 |

TABLE 3

| Condi. Exp. | ex8 | ex9 | ex10 |
|---|---|---|---|
| 1 | 0.660 | 0.087 | 0.172 |
| 3 | 0.940 | 0.093 | 1.220 |
| 4 | 0.940 | 0.093 | — |
| 5 | — | — | −1.220 |
| 6 | 0.877 | 0.971 | 1.078 |
| 7 | 0.079 | 0.079 | 0.102 |
| 8 | 0.339 | 0.338 | 0.345 |
| 10 | 1.127 | 1.274 | 1.220 |
| 11 | 1.019 | 1.103 | 0.998 |
| 12 | −1.127 | −1.274 | −1.220 |

TABLE 4

| Condi. Exp. | ex11 | ex12 | ex13 |
|---|---|---|---|
| 1 | 1.544 | 3.996 | 0.089 |
| 3 | 1.435 | 0.938 | 0.076 |
| 4 | — | 0.938 | 0.076 |
| 5 | −1.435 | — | — |
| 6 | 1.029 | 0.909 | 1.340 |
| 7 | 0.101 | 0.066 | 0.086 |
| 8 | 0.342 | 0.221 | 0.358 |
| 10 | 1.435 | 3.878 | 1.628 |
| 11 | 0.992 | 2.292 | 1.415 |
| 12 | −1.435 | −3.878 | −1.628 |

TABLE 5

| Condi. Exp. | ex1a | ex2a | ex3a | ex4a |
|---|---|---|---|---|
| 2 | 85.098 | 68.078 | 57.866 | 81.694 |
| 9 | 2.57 | 2.18 | 1.58 | 2.49 |

TABLE 6

| Condi. Exp. | ex5a | ex6a | ex7a |
|---|---|---|---|
| 2 | 59.568 | 90.204 | 85.098 |
| 9 | 1.93 | 3.30 | 4.14 |

TABLE 7

| Condi. Exp. | ex8a | ex9a | ex10a |
|---|---|---|---|
| 2 | 102.117 | 85.098 | 153.176 |
| 9 | 2.71 | 5.91 | 4.46 |

TABLE 8

| Condi. Exp. | ex11a | ex12a | ex13a |
|---|---|---|---|
| 2 | 51.059 | 25.529 | 85.098 |
| 9 | 1.45 | 0.715 | 3.880 |

TABLE 9

| Condi. Exp. | ex1b | ex2b | ex3b | ex4b |
|---|---|---|---|---|
| 2 | 136.156 | 119.137 | 110.627 | 136.156 |
| 9 | 4.10 | 3.81 | 3.01 | 4.14 |

TABLE 10

| Condi. Exp. | ex5b | ex6b | ex7b |
|---|---|---|---|
| 2 | 115.733 | 153.176 | 136.156 |
| 9 | 3.75 | 5.59 | 6.61 |

TABLE 11

| Condi. Exp. | ex8b | ex9b | ex10b |
|---|---|---|---|
| 2 | 170.195 | 153.176 | 170.195 |
| 9 | 4.50 | 5.91 | 4.95 |

TABLE 12

| Condi. Exp. | ex11b | ex12b | ex13b |
|---|---|---|---|
| 2 | 107.223 | 59.568 | 170.195 |
| 9 | 3.04 | 1.665 | 7.740 |

Figure 29:
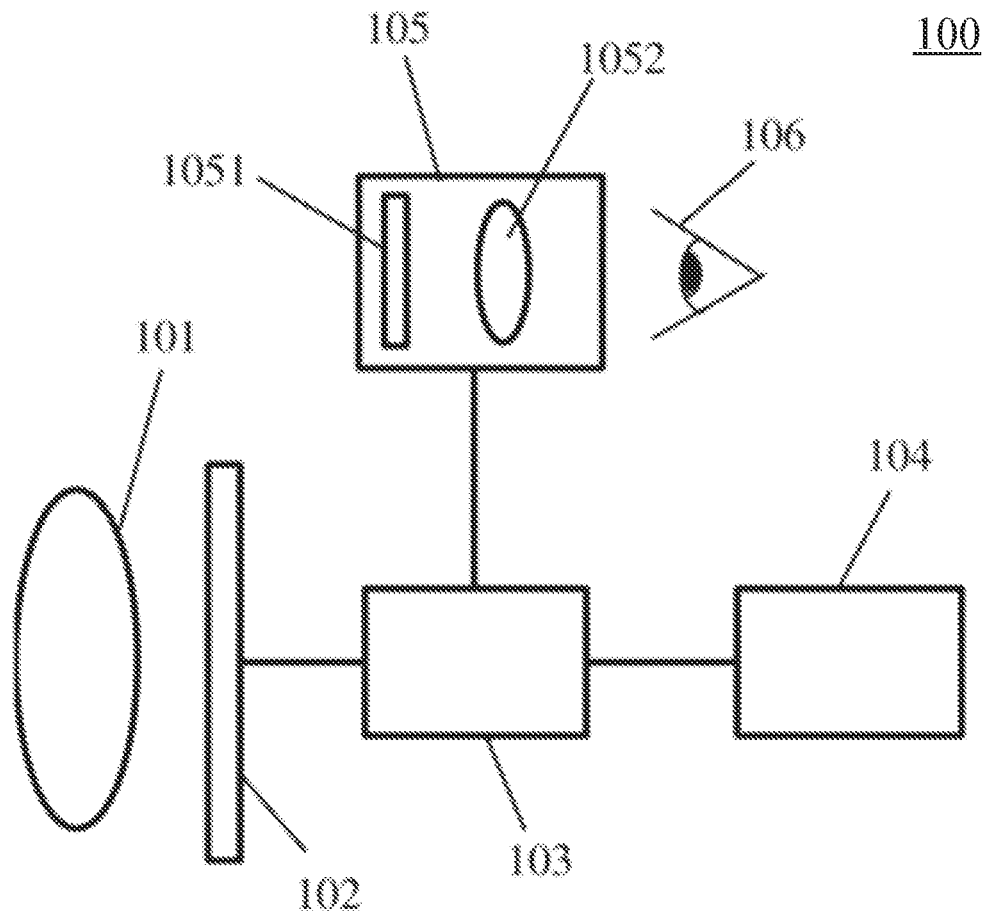
FIG. 29 is a block diagram of an image pickup system according to this embodiment.

Referring now to FIG. 29, a description will be given of an image pickup system according to this embodiment. FIG. 29 is a block diagram of an image pickup system 100. The image pickup system 100 includes an image pickup optical system 101, an image sensor 102, an image processing circuit 103, a recording medium 104, and a viewfinder optical system unit (image display apparatus) 105.

The imaging optical system 101 is included in a lens apparatus (interchangeable lens). The image sensor 102, the image processing circuit 103, the recording medium 104, and the viewfinder optical system unit (image display apparatus) 105 are included in an image pickup apparatus body. In this embodiment, the image pickup system 100 includes the image pickup apparatus body, and the lens apparatus that is attachable to and detachable from the image pickup apparatus body. However, the present invention is not limited to this, and is applicable to an image pickup apparatus in which an image pickup apparatus body and a lens apparatus are integrated with each other.

The image sensor 102 photoelectrically converts an optical image (object image) formed via the image pickup optical system 101, and outputs image data. The image processing circuit 103 performs predetermined image processing for the image data output from the image sensor 102, and forms an image. The formed image is recorded in the recording medium 104 such as a semiconductor memory, a. magnetic tape, or an optical disc. The image formed in the image processing circuit 103 is displayed on the viewfinder optical system unit 105. The viewfinder optical system unit 105 includes an image display element 1051 and a viewfinder optical system (observation optical system according to each example) 1052. The image display element 1051 includes a liquid crystal display element LCD, an organic EL element, and the like. The viewfinder optical system 1052 is an observation optical system for observing an image displayed on the image display plane of the image display element 1051.

Each example can provide a compact observation optical system having high optical performance, and an image display apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An observation optical system configured to observe an image displayed on an image display plane, the observation optical system comprising:
a negative lens and a positive lens,
wherein at least one of the negative lens and the positive lens has a lens surface having a Fresnel shape, and
wherein the following inequalities are satisfied:

$$0.085 < |\Phi r/\Phi f| < 4.00$$

$$20 < hsag/\lambda < 180$$

$$-5.0 < \Phi\ ln/\Phi f < -0.5$$

where $\Phi r$ is a power of the lens surface of the Fresnel shape (which is a maximum value of the power when there are a plurality of the lens surfaces each having the Fresnel shape), $\Phi f$ is a power of the observation optical system as a whole, hsag is a length (mm) of a maximum wall surface on the lens surface having the Fresnel shape, $\lambda$ is a wavelength (mm) of the d-line, and $\Phi$ ln is a power of a negative lens having the strongest negative power among negative lenses included in the observation optical system.

2. The observation optical system according to claim 1, wherein the following inequality is satisfied:

$$0.01 < |\Phi fl/\Phi f| < 3.00$$

where $\Phi fl$ is a power of a lens having the lens surface having the Fresnel shape among the negative lens and the positive lens, which is a maximum value of the power when there are the plurality of lens surfaces each having the Fresnel shape.

3. The observation optical system according to claim 1, wherein the positive lens has the lens surface having the Fresnel shape and the following inequality is satisfied:

$$0.02 < \Phi fp/\Phi f < 3.00$$

where $\Phi fp$ is a power of the positive lens, which is a maximum value of the power when there are the plurality of lens surfaces each having the Fresnel shape.

4. The observation optical system according to claim 1, wherein the negative lens has the Fresnel-shaped lens surface and the following inequality is satisfied:

$$-2.40 < \Phi fn/\Phi f < -0.60$$

where $\Phi fn$ is a power of the negative lens, which is a maximum value of the power when there are the plurality of lens surfaces each having the Fresnel shape.

5. The observation optical system according to claim 1, wherein the following inequality is satisfied:

$$0.05 < Tfd/f < 3.00$$

where Tfd is a distance on an optical axis from a lens surface on an image display plane side of the observation optical system to a lens surface on an observation side of the observation optical system, and f is a focal length of the observation optical system as a whole.

6. The observation optical system according to claim 1, wherein the following inequality is satisfied:

$$0.01 < Tfr/f < 0.30$$

where Tfr is a thickness on an optical axis of the negative lens and the positive lens having a lens surface having the Fresnel shape, and f is a focal length of the observation optical system as a whole.

7. The observation optical system according to claim 1, wherein the following inequality is satisfied:

$$0.05 < Yp/f < 0.60$$

where Yp is half a diagonal length of the image display plane, and f is a focal length of the observation optical system as a whole.

8. The observation optical system according to claim 1, wherein the following inequalities are satisfied:

$$0.1 < \mathrm{atan}((\alpha-\beta)/1-\alpha\beta))*60 < 12.0 \text{ (min)}$$

$$\alpha = (ep + hsag)/(hea/2)$$

$$\beta = ep/(hea/2)$$

where ep is a distance from a lens closest to an observation position to an eye point among lenses each having a refractive power in the observation optical system, and hea is an effective diameter of the lens surface having the Fresnel shape.

9. The observation optical system according to claim 1, wherein the following inequality is satisfied:

$$0.2 < |\Phi l|/\Phi f < 6.0$$

where $|\Phi|$ is a maximum value among absolute values of powers of lenses included in the observation optical system.

10. The observation optical system according to claim 1, wherein the following inequality is satisfied:

$$0.96 < \Phi lp/\Phi f < 2.7$$

where $\Phi lp$ is a power of a positive lens having the strongest power among positive lenses included in the observation optical system.

11. An image display apparatus comprising:
an image display element; and
the observation optical system according to claim 1 configured to observe an image displayed on an image display plane of the image display element.

12. The observation optical system according to claim 1, wherein the following inequality is satisfied:

$$-5.0 < \Phi \ ln/\Phi f < -0.7$$

* * * * *